(12) United States Patent
Shifer

(10) Patent No.: US 10,599,568 B2
(45) Date of Patent: Mar. 24, 2020

(54) MANAGEMENT OF COHERENT LINKS AND MULTI-LEVEL MEMORY

(71) Applicant: Intel Corporation, Santa Clara, CA (US)

(72) Inventor: Eran Shifer, Tel Aviv (IL)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/948,569

(22) Filed: Apr. 9, 2018

(65) Prior Publication Data
US 2019/0042425 A1 Feb. 7, 2019

(51) Int. Cl.
*G06F 12/0815* (2016.01)
*G06F 12/084* (2016.01)
(Continued)

(52) U.S. Cl.
CPC ........ *G06F 12/0815* (2013.01); *G06F 12/084* (2013.01); *G06F 12/0831* (2013.01);
(Continued)

(58) Field of Classification Search
CPC .......... G06F 12/0815–0837; G06F 12/10–109; G06F 2212/301–302
See application file for complete search history.

(56) References Cited

U.S. PATENT DOCUMENTS

| 6,338,119 B1* | 1/2002 | Anderson | G06F 12/0835 710/22 |
| 6,891,543 B2* | 5/2005 | Wyatt | G06F 12/0888 345/541 |

(Continued)

OTHER PUBLICATIONS

Patterson et al. Computer Architecture: A Quantitative Approach. 1996. Morgan Kaufman. pp. 375-390, 447-453. (Year: 1996).*

(Continued)

*Primary Examiner* — Nathan Sadler
(74) *Attorney, Agent, or Firm* — Compass IP Law, PC

(57) ABSTRACT

Techniques for managing multi-level memory and coherency using a unified page granular controller can simplify software programming of both file system handling for persistent memory and parallel programming of host and accelerator and enable better software utilization of host processors and accelerators. As part of the management techniques, a line granular controller cooperates with a page granular controller to support both fine grain and coarse grain coherency and maintain overall system inclusion property. In one example, a controller to manage coherency in a system includes a memory data structure and on-die tag cache to store state information to indicate locations of pages in a memory hierarchy and an ownership state for the pages, the ownership state indicating whether the pages are owned by a host processor, owned by an accelerator device, or shared by the host processor and the accelerator device. The controller can also include logic to, in response to a memory access request from the host processor or the accelerator to access a cacheline in a page in a state indicating ownership by a device other than the requesting device, cause the page to transition to a state in which the requesting device owns or shares the page.

29 Claims, 16 Drawing Sheets

(51) Int. Cl.
*G06F 12/123* (2016.01)
*G06F 12/1009* (2016.01)
*G06F 12/0831* (2016.01)
*G06F 12/1027* (2016.01)

(52) U.S. Cl.
CPC ........ *G06F 12/1009* (2013.01); *G06F 12/123* (2013.01); *G06F 12/1027* (2013.01)

(56) References Cited

U.S. PATENT DOCUMENTS

| | | | | |
|---|---|---|---|---|
| 7,680,987 | B1* | 3/2010 | Clark | G06F 12/08 711/147 |
| 2011/0252200 | A1* | 10/2011 | Hendry | G06F 12/0831 711/121 |
| 2015/0309940 | A1* | 10/2015 | Kumar | G06F 12/1009 345/506 |
| 2016/0019168 | A1* | 1/2016 | Rychlik | G06F 12/1483 711/152 |
| 2016/0246721 | A1* | 8/2016 | Bostley, III | G06F 9/45558 |
| 2017/0337136 | A1* | 11/2017 | Basu | G06F 12/1009 |
| 2018/0011792 | A1* | 1/2018 | Koker | G06F 12/0804 |
| 2018/0293690 | A1* | 10/2018 | Ray | G06F 12/0811 |
| 2018/0293693 | A1* | 10/2018 | Ray | G06F 12/0811 |

OTHER PUBLICATIONS

Cantin et al. "Improving Multiprocessor Performance with Coarse-Grain Coherence Tracking." 2005. IEEE. ISCA '05. (Year: 2005).*
Kim et al. "Subspace Snooping: Filtering Snoops with Operating System Support." Sep. 2010. ACM. PACT '10. pp. 111-122. (Year: 2010).*
Power et al. "Heterogeneous System Coherence for Integrated CPU-GPU Systems." Dec. 2013. ACM. MICRO-46. pp. 457-467. (Year: 2013).*

* cited by examiner

System memory size: X
Number of pages N: X/4K (round up)
Size of page state table: X/16K (round up)
Page state table entry format, local memory:

| S1 | S0 | |
|----|----|---|
| 0 | 0 | S: Shared page with line-granular coherency. Page is mapped to Domain 0. |
| 0 | 1 | D0: Page granular coherency, mapped to Domain 0. |
| 1 | 0 | D1: Page granular coherency, mapped to Domain 1. |
| 1 | 1 | Reserved |

| Page N state |
| |
| Page n state |
| ... |
| Page 2 state |
| Page 1 state |
| Page 0 |

FIG. 7A

| Tag | Coherency State (modified/exclusive/shared) | Valid Bits | Domain bit (D-bit) |
|---|---|---|---|
| | | | |
| | | | |

FIG. 7B

MANAGEMENT OF COHERENT LINKS AND MULTI-LEVEL MEMORY

FIELD

Descriptions pertain generally to coherency of shared memory and multi-level memory management, and particular descriptions relate to coherency of shared memory and multi-level memory management for systems including an accelerator.

BACKGROUND

Platforms today have a variety of topologies, including one or more host processors, one or more accelerators, and various memory hierarchies. For example, some systems today include multi-level memory hierarchies in which a faster smaller memory (e.g., a DRAM) serves as a cache for a larger memory (e.g., a non-volatile memory). Additionally, in platforms including multiple host processors and or accelerators, each host processor and accelerator may be coupled with its own memory. Although including accelerator devices and accelerator-attached memory to a system can have advantages, there are also challenges and drawbacks, such as the power and performance costs associated with maintaining coherency in a shared virtual memory environment.

FIGURES

The following description includes discussion of figures having illustrations given by way of example of implementations of embodiments of the invention. The drawings should be understood by way of example, and not by way of limitation. As used herein, references to one or more "embodiments" or "examples" are to be understood as describing a particular feature, structure, and/or characteristic included in at least one implementation of the invention. Thus, phrases such as "in one embodiment" or "in one example" appearing herein describe various embodiments and implementations of the invention, and do not necessarily all refer to the same embodiment. However, they are also not necessarily mutually exclusive.

FIG. 7A illustrates an example of a page state table.

FIG. 7B illustrates an example of information stored in a snoop filter, including a domain bit.

DETAILED DESCRIPTION

Figure 1A:
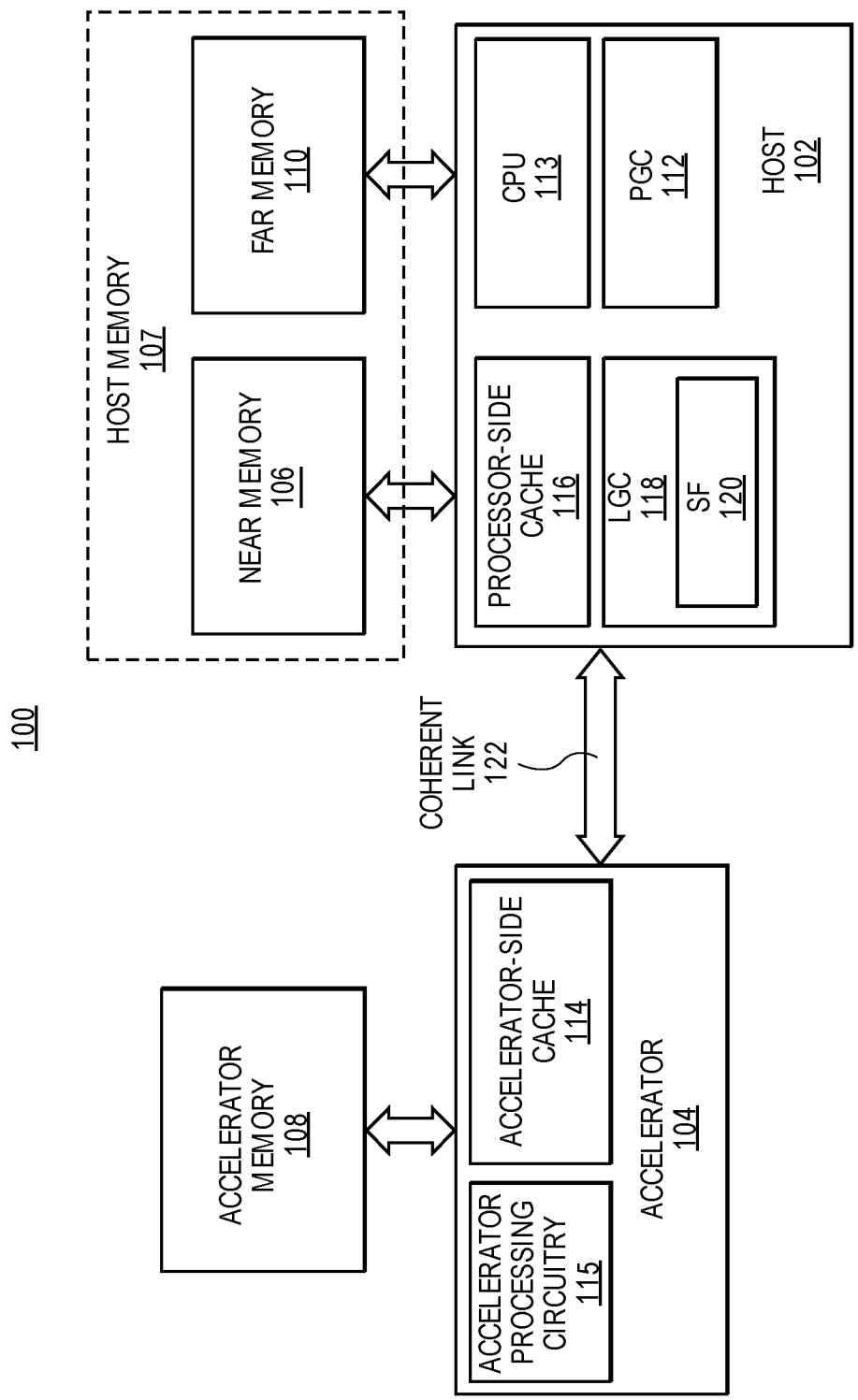
FIG. 1A illustrates a block diagram of an example of a system in which techniques for managing coherency and multi-level memory can be implemented.

Methods, apparatuses, and systems for coherency and multi-level memory management are described herein. In one example, a unified controller can manage various memory hierarchies, including multi-level memory, and also manage coherency in a system with one or more host processors and one or more accelerator devices. A unified controller can manage coherency and multi-level memory by storing state information for pages that both indicates the location of the pages in a memory hierarchy (e.g., page residency location between a near memory cache and far memory) in addition to an ownership state for the pages. In one example, the ownership state of a page indicates whether the page is mapped to a domain or shared amongst multiple domains, where a domain indicates ownership by one or more agents. In one such example, a first domain (D0) indicates ownership by a host processor and a second domain (D1) indicates ownership by an accelerator device. The ownership state of a given page can indicate the page is mapped to D0, mapped to D1, or shared between D0 and D1. Additional or different ownership states are also possible.

The unified controller can manage access to pages according to ownership state and initiate page state transitions to maintain coherency and promote forward progress in the system. In one example, the unified controller tracks page ownership state at a page granularity and is referred to herein as a page granular controller (PGC).

In addition to the PGC, in one example, a line granular controller (LGC) manages coherency at a finer granularity (e.g., cacheline granularity). In one such example the LGC includes a snoop filter to track coherency of a subset of cachelines in system memory. The LGC may also track domain information (referred to herein as D bits) for cachelines in system memory, which can enable the LGC to determine whether to track a cacheline in the snoop filter and/or whether the LGC can handle an access request, or whether the request should be forwarded to the PGC for handling. Domain tracking in LGC enables optional usage of last-level-cache for caching non-D0 lines. In an example in which the LLC caches only D0 lines, the LGC may not track domain information. The PGC can provide coarse granularity coherency control between the host and accelerator for a majority of pages and the LGC enables finer granular coherency control for pages that are being concurrently accessed by multiple entities (such as both the host processor and the accelerator) in addition to providing fine granular coherency support for pages that are accessed uniquely by the host processor or by the accelerator.

Tracking and controlling page ownership state and multi-level memory mapping with the PGC can enable a shared memory environment that can be coherently accessed by both host processors and accelerators. In one such example, managing coherency and page location in hardware can significantly simplify software programming of both file system persistent memory and parallel programming of host and accelerator and enable better software utilization of both host and accelerators. The coherency tracking can be transparent to software, so that software can assume coherency of memory accesses and obtain consistent results. Additionally, managing both page state transitions and multi-level memory mapping with a unified controller enables efficient host/accelerator coherence without requiring significant investments that are specific to coherency maintenance in links between the host and accelerator device and without requiring significant hardware investments that are specific to coherency maintenance in the host.

FIG. 1A illustrates a block diagram of an example of a system in which techniques for managing coherency and multi-level memory can be implemented. The system 100 includes a host 102 and an accelerator device 104. The host 102 typically includes a central processing unit (CPU) 113 and the accelerator device 104 includes accelerator or processing circuitry 115. The CPU 113 may be referred to as a host processor. The accelerator device 104 may be referred to herein as an accelerator or simply as a device. The host 102 and accelerator 104 are coupled via a coherent link 122. The coherent link 122 can include a link and interfaces for communication between the host processor and the accelerator. The coherent link 122 can be compliant with a standard. In one example the coherent link 122 is compliant with a standard that is not fully coherent such as the PCIe (Peripheral Component Interconnect Express) standard (which can provide one-sided coherency), or other standard capable of coupling a host processor with an accelerator device. In an example in which the coherent link 122 complies with a standard that is not fully coherent, the link's coherency is enabled by the techniques described herein. The coherent link can represent an internal SoC interconnect or be layered on top of various physical links such as PCIe, OPIO (on-package input/output) or EMiB (embedded multi-die interconnect bridge) for off-package or in-package routing.

The accelerator 104 can include, for example, a graphics accelerator device (e.g., a graphics processing unit (GPU)), a machine learning accelerator (also known as an artificial intelligence (AI) accelerator), or any other accelerator device. Although the illustrated example shows a system with one host and one accelerator device, systems having different topologies can also implement the techniques described in the present disclosure. For example, the techniques described herein can apply to a system with two or more devices that are capable of processing data and which access data stored in memory. For example, a system can include two or more CPUs (where each CPU is mapped to a different domain or where several CPUs are grouped to a domain), a CPU and multiple accelerators, multiple CPUs and multiple accelerators, etc. Also, although the host and accelerator are depicted as discrete devices in FIG. 1A, the host processor and accelerator can be integrated in a single SoC (system on a chip). Also, multiple CPUs that are mapped to different domains may be implemented as discrete CPUs, MCP CPUs within a single package, or integrated CPUs connected to an internal routing interface in a SoC or any combination of the above.

In the illustrated example, the memory hierarchy includes the accelerator memory 108, the near memory 106 and the far memory 110. The memory hierarchy can also be defined as including host and accelerator-side caches (e.g., the accelerator-side cache 114 and the processor-side cache 116). In the illustrated example, the system includes both host-attached memory 107 that is coupled with the host 102, and accelerator-attached memory 108 that is coupled with the accelerator 104. The term "coupled" can refer to elements that are physically, electrically, communicably, and/or logically connected either directly or indirectly, and may be used interchangeably with the term "connected." For example, a UMA (uniform memory access) memory can be statically or dynamically partitioned through range registers or page table entry attributes to memory that is logically coupled with host CPUs and memory that is logically coupled with the accelerator. Alternatively, a memory may have no additional attributes that provide a-priori information of memory coupling preference to either CPU or accelerator (for example, UMA memory, with no range partitions or page table entry attributes which provide coupling information). Thus, although the host may be coupled with both the accelerator memory 108 and host memory 107, the host has a more direct link with the host memory 107 than the accelerator memory 108. For example, an access by the host 102 to the accelerator memory 108 goes through both the coherent link 122 and a link coupling the accelerator 104 with the accelerator memory 108, whereas the host may be coupled with the host memory 107 via a single link (or if not a single link, a more direct link than with the accelerator memory 108). Thus, a memory access by the host to the host memory 107 is typically faster than a memory access by the host to the accelerator memory 108, and a memory access by the accelerator to the accelerator memory 108 is typically faster than a memory access by the accelerator 104 to the host memory 107. A link connecting devices can include hardware and circuitry including one or more of interface circuitry, pads, pins, vias, traces and/or other suitable contact structures. The differences in latencies of memory accesses by an accelerator to its own memory versus host-attached memory can be especially great when a high bandwidth, low latency link is used to couple the accelerator memory 108 with the accelerator 104. For example, some accelerators are directly coupled with memory in accordance with a standard such as GDDR (graphics DDR), HBM, or Wide I/O, which can enable fast access by the accelerator processing circuitry 115.

The host memory 107 may include one-level or multi-level (e.g., two-level (2LM)) memory. The example illustrated in FIG. 1A shows a two-level memory with a near memory 106 (which can operate as a near memory cache) and a far memory 110. In one such example, the near memory 106 can include a DRAM (dynamic random access memory). In one example, the near memory 106 includes a set-associative near memory cache set. The far memory 110 can include, for example, a non-volatile storage device that may have a higher capacity than the near memory 106. In one such example, the far memory 110 includes a 3D crosspoint memory device (e.g., 3D XPoint™ memory) or other non-volatile storage device. In some implementations, the memory hierarchy may also include byte-addressable persistent memory, utilized to simplify file system software and provide direct file control to applications.

Conventionally, the host processor 113 would perform operations on data stored in the host-attached memory and the accelerator would perform operations on data stored in the accelerator-attached memory. In order to share data between the processor and accelerator, software needed to be aware of the separate host and device memory spaces and relied on a run-time device driver and the operating system (OS) memory manager to swap pages between the host memory and device memory (e.g., via driver calls). However, the software overhead cost of OS memory management kernel code and device driver system calls can be significant. Furthermore, software complexity is high, and debug of software coherency errors is difficult for such conventional systems due to the need to include explicit map and unmap operations, software barriers, cache flushes and/ or system calls for page copies performed by a software API and/or device driver running user-level application code. Additionally, relying on software to enable access to memories attached to various devices incurs performance penalties and sub-optimal usage of both the CPU and accelerator.

In contrast, in one example, the system includes shared virtual memory that can include both the host memory 107 and the accelerator memory 108 and includes hardware logic to manage both coherency and multi-level memory mapping. Thus, the accelerator memory 108 and the host memory 107 can be viewed by the OS and software as a shared coherent virtual memory, which can minimize the OS and software overhead and complexity associated with such memory hierarchies (e.g., by not requiring knowledge by the software of the memory hierarchy and by not requiring page swaps for accesses by both the host and accelerator to the same page). In one example, the management of coherency across the accelerator 104 and host 102 is handled in hardware by one or more controllers on the host 102 and accelerator 104. In the illustrated example, the host 102 includes a page granular controller (PGC) 112 and a line granular controller (LGC) 118.

In one such example, the PGC manages state information for pages in system memory, including pages in the accelerator memory 108 and the host memory 107. In one example, the line granular controller 118 includes a snoop filter 120 to track locations of a subset of cachelines in the memory hierarchy at a cacheline granularity. Thus, the PGC 112 and LGC 118 are part of the coherent fabric of the system 100 to manage and maintain coherency in the system. The coherent fabric is an entity or system that can include logic across multiple agents or processing elements (e.g., host CPUs and accelerators) and the interconnects or links that couple the processing elements.

Although FIG. 1A is illustrated as having a PGC and an LGC only on the host side (making it asymmetric), a page granular controller and/or line granular controller can be included in the accelerator 104 in addition to, or instead of, the PGC of the host 102. A system with PGCs included in each agent (e.g., each accelerator and host processor) may be defined as a symmetric system. In a symmetric system, the coherent fabric would include the PGCs and LGCs of each of the processing elements. In a symmetric multi-socket system, multiple PGCs and/or LGCs may interact to maintain a consistent view of page and cacheline state across sockets. In such systems, a PGC may be defined as home agent for its local memory and as a caching agent for remote memory. Alternatively, a PGC may be defined as home agent for its local memory and the LGC as a caching agent for remote memory. A symmetric system PGC is configured to resolve conflicts and send snoops for requests that target its local memory. In addition, in a symmetric system, the PGC and/or LGC may be configured to send requests and respond to snoops for requests that target remote memory. In an asymmetric multi-socket system, a single PGC may maintain consistent view of page coherency state. In such systems, a PGC is defined as home agent for both local and remote memories. The asymmetric system PGC is configured to resolve conflicts and send snoops for requests that target both local and remote memory. A symmetric system with PGCs included in each agent may be more complex than an asymmetric system (e.g., the accelerator logic can be simplified if it does not include its own PGC) but may result in faster memory accesses in some circumstances.

Figure 1B:
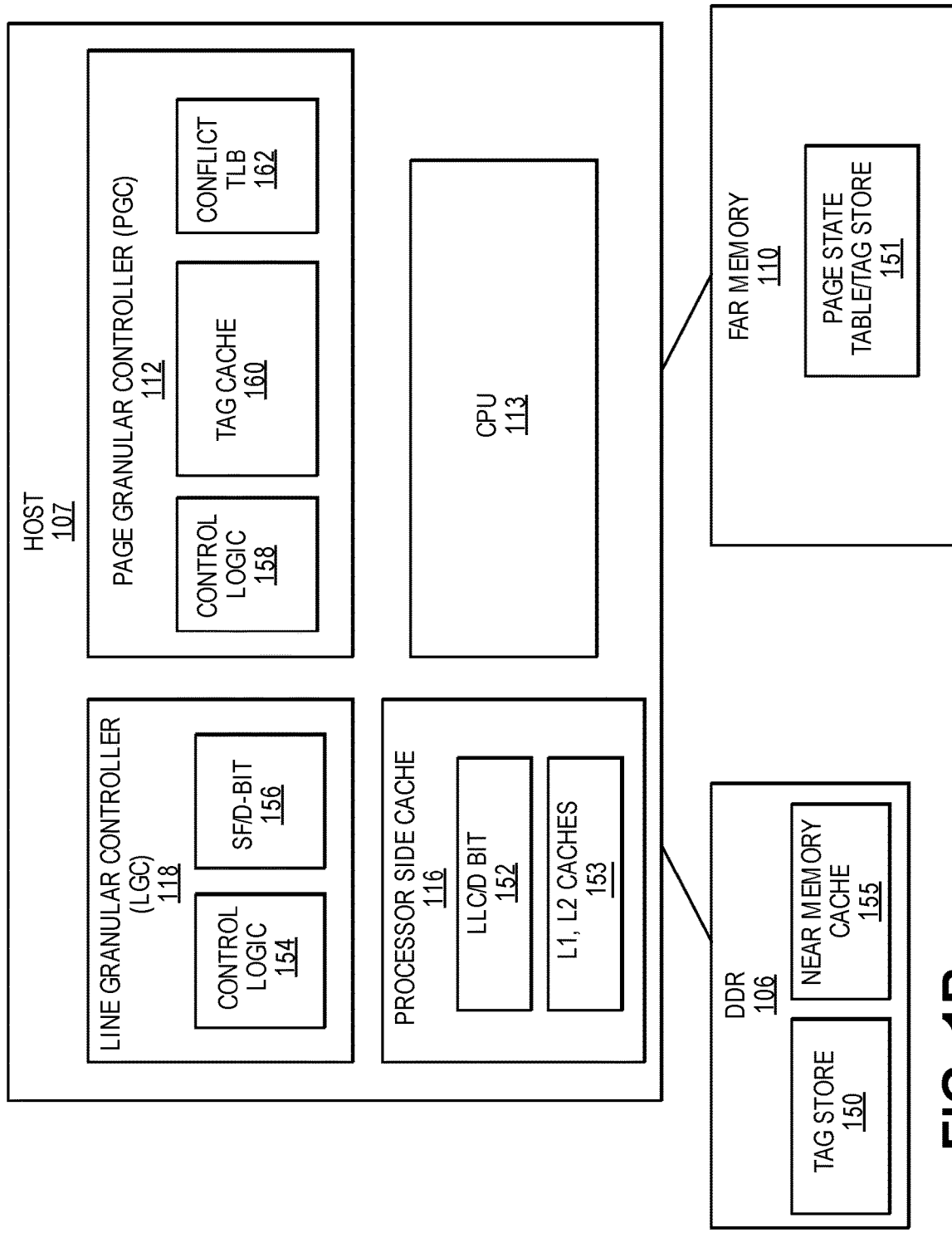
FIG. 1B illustrates a block diagram of an example of a host in which techniques for managing coherency and multi-level memory can be implemented.

FIG. 1B illustrates an example of a host including a page granular controller and a line granular controller. In one example, the PGC 112 tracks page residency and state information for pages of memory, and the LGC 118 tracks cache coherency information for cachelines, where a page of memory includes multiple cachelines. Thus, in one example, the PGC 112 tracks units of memory at a coarser granularity than the LGC 118. In one such example, a page of memory is 4 kilobytes (KB) and a cacheline is 64 bytes (B). Although the illustrated example shows page and cacheline-granularities, other granularities can be used (e.g., pages or cachelines that are smaller or larger than the above example, or units of memory other than pages and cachelines).

In the illustrated example, the LGC 118 includes a snoop filter 156 and control logic 154 to control the snoop filter. In one example, the snoop filter is an on-die directory that points to potential locations of cached copies of cachelines of system memory. Each processing element (e.g., the host processor and the accelerator) can have one or more levels of cache. In the example illustrated in FIG. 1B, a processor-side cache 116 includes the L1 and L2 caches of the processor cores and a last level cache (LLC) 152. The LLC 152 may be the last level of cache that a cacheline is checked for before accessing memory. In one example, the combination of the LGC snoop filter and the LLC 152 can be inclusive of the processor cores' L1 and L2 caches 153 and a filtered portion of the accelerator side cache.

The snoop filter 156 can be implemented with an SRAM (static random access memory) array or other hardware storage. In one example, the snoop filter is cache-line granular (i.e., it tracks coherency at a cacheline granularity). In this example, the snoop filter 156 and/or last level cache 152 are modified to have an additional domain marker bit for each cached line. In one example, both the LLC 152 and the snoop filter 156 include domain information. In another example, the D bits in the snoop filter cover the cachelines in the LLC. Therefore, the snoop-filter and/or the last level cache can maintain domain bits (D bits) in addition to valid bits (e.g., core-valid bits (CV bits) that indicate cores that may have valid copies of the cacheline).

In one such example, the D bits include one or more bits for each cacheline entry in the snoop filter to indicate information about which domain the cacheline is in, as described in more detail below. The D bits can alternatively be implemented separately from the snoop filter 156. In response to detecting a memory access request for a cacheline, the control logic 154 of the LGC will check to see if the cacheline is allocated in the snoop filter. If the cacheline is not allocated in the snoop filter 156, the control logic 154 forwards the request to a page granular controller. If the cacheline is allocated in the snoop filter 156, the control logic 154 determines whether it can service the request or not (e.g., whether it can resolve all locations of copies of the cacheline). If the LGC 118 cannot service the request, the control logic 154 forwards the request to the PGC 112.

The PGC 112 includes control logic 158 to store and track page state information. In one example, the PGC stores page state information in memory, and for at least some pages, on-die. Storing state information for some pages on-die can avoid additional memory references for each memory transaction. In the illustrated example, the PGC 112 includes a tag cache 160 as on-die storage to store state information. The tag cache 160 stores information for memory pages (e.g., a subset of all memory pages in system memory, such as recently used memory pages). In one example, the tag cache 160 stores information (e.g., a tag, pointer, or other location information) indicating where a page is located in the memory hierarchy as well as ownership status information. For example, in a 2LM system, the tag cache can store information (e.g., pointers) indicating the location in the near memory 106 (e.g., near memory cache) of a far memory page. In addition to location information, the tag cache can store ownership status information indicating whether a memory page is owned by a host processor (e.g., CPU 113), owned by an accelerator (e.g., the accelerator device 104 of FIG. 1A), or shared by the host processor and the accelerator. The tag cache 160 can include, for example, an SRAM or other hardware storage on the host 107.

In one example, the system also includes one or more data structures in memory to store state information for all pages. For example, in a multi-level memory system, a tag store 150 in memory (e.g., in DDR memory 106) can store state information for all memory pages in system memory (or a larger subset of memory pages than the tag cache 160, for example, the tag store may store information of all pages in the near memory cache). In one such example, the tag store 150 is stored in DDR stolen memory (e.g., memory that is "stolen" from the operating system, and thus not exposed or reported by the BIOS to the operating system). Therefore, in the example illustrated in FIG. 1B, the DDR memory 106 includes both a near memory cache 155 and the tag store 150. The tag store can include a data structure, such as a linked list or other data structure, that stores the state information for memory pages. Other structures other than the tag cache and the tag store can be used to store the state and page residency information. Additionally, a page state table can be included in system memory to store state information for all memory pages. For example, the page state table 151 can be stored in far memory 110. In one such example, recently accessed parts of the page state table can also be cached in the near memory cache, following a similar caching scheme between near memory cache and far memory as is applied to regular system memory pages. The page state table 151 in far memory 110 can be similar to the tag store 150 in DDR memory, but stores state information for all pages instead of a subset of pages. In addition, the page state table can also be allocated in stolen memory. In a 1LM system, the tag-store and the page state table can be merged into a single data structure (e.g., in a 1LM system, there can be only one tag store/page state table in memory that stores state for all pages).

Thus, in the illustrated example, the system includes on-die storage (the tag cache 160) and off die storage (both the tag store 150 and the page state table 151), but other structures are also feasible for logging the residency and ownership state of memory pages. In one example, a system may have the page residency state implemented in memory ECC (error code correction) bits grouped at page granularity.

The PGC 112 also includes control logic 158 to maintain the tag cache (and tag store and/or page state table, if present). For example, the control logic 158 can be responsible for determining when to cause a page state transition, causing page state transitions, and updating page ownership state in the tag cache 160 after page state transitions. In one example, page state transitions performed in the PGC are triggered by bus transactions or internal logic. A state machine diagram illustrating one example of page state transitions is illustrated in FIG. 2B, described below. The PGC page state transitions may include cache flushes and data movements. For example, consider a case where the PGC observes that the accelerator device has a memory reference to a page that is owned by the host (e.g., mapped to D0, and therefore the page may have some of its cacheline copies in the host caches). The PGC can start a page state transition from the D0 state to the D1 state, which may include flushing these cachelines from the host cache and may also include copying the cachelines to the accelerator device's memory. Thus, in one such example, the PGC state transition flow can replace the DMA operations that happen in conventional systems as a result of explicit copies between the GPU and CPU done by software. During a page state transition flow, the PGC monitors for conflicting requests, and may use a structure such as a conflict TLB when a conflict is identified. Page state transitions maintain coherency and guarantee forward progress.

The PGC may implement different page state transition schemes for local memory pages and remote memory pages. Different page state transition schemes may be desirable for local memory pages and remote memory pages due to differences that exist between local and remote memory. While local memory can be viewed as a shared resource between the device and host, especially for UMA device, remote memory can typically be viewed as memory that is installed primarily for the benefit of the device.

Page state mapping can have profound impact on system performance. Given the various platform configurations and workloads, a system may define various page transition profiles for performance optimizations. The coherent device bus master and PGC internal logic may cooperate as source and target entities, to implement a defined page transition profile. Initial setting of memory pages states can also be part of the page transition profile, as it may affect the dynamic sequence of page state transitions. For example, software can be used to initialize page states (e.g., via the PGC) and minimize un-desired page state transitions. For example, the operating system may initialize its kernel code pages to the S state, effectively disabling page state transitions for these pages, for the given example above for page state transitions, since there is no expectation that these pages will participate in any collaborative work between host processor and the accelerator In the illustrated example, the PGC 112 also handles conflicts arising when a host processor and an accelerator concurrently request access to the same memory page. In the event of a conflict to access the same page, the control logic 158 can cause the page to be allocated to a conflict TLB (translation lookaside buffer) 162 or other structure to indicate a conflict and track the page's pre-conflict state. The conflict TLB or other structure can include, for example, an SRAM or other hardware storage. In one example, conflicts can be tracked with a FIFO (first in first out) of recent page conflicts. Regardless of the type of structure used, a hardware structure to track conflicts can minimize spurious page state transitions for run-time identified shared pages. The control logic 158 can then cause a page state transition to the shared state to enable the conflicting requests to proceed without excessive page state transitions.

Thus, the PGC and LGC can maintain the inclusion property to enable coherency. In a typical hierarchical cache architecture, maintenance of inclusion property is fundamental for satisfying hardware coherency requirements.

Specifically, the inclusion property requires that the existence and state of cacheline copies in a low level cache be tracked in higher level cache, snoop filter, or directory. In one example, the system maintains the inclusion property through implementation of cacheline granular snoop filter and domain marker (D bit) in the coherent fabric and page granular directory (e.g., tag cache) in PGC. The coherent fabric has sufficient information to determine if a coherent request can be internally satisfied in the LGC level or needs to be forwarded to the PGC level for page state resolution.

Figure 2A:
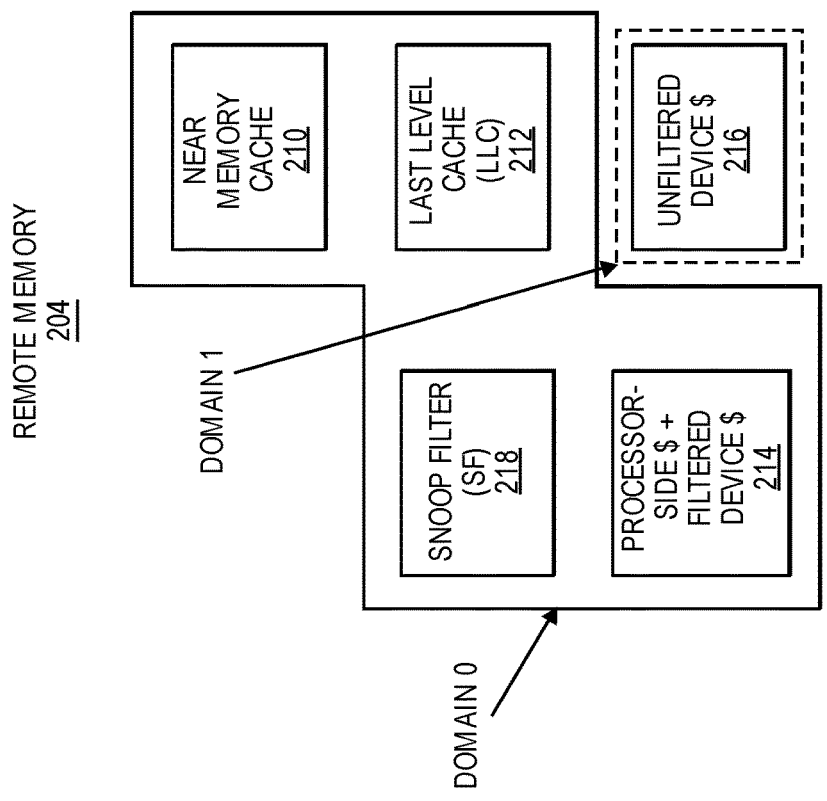
FIG. 2A illustrates an example of domains defined relative to local memory and remote memory.
Figure 2A:
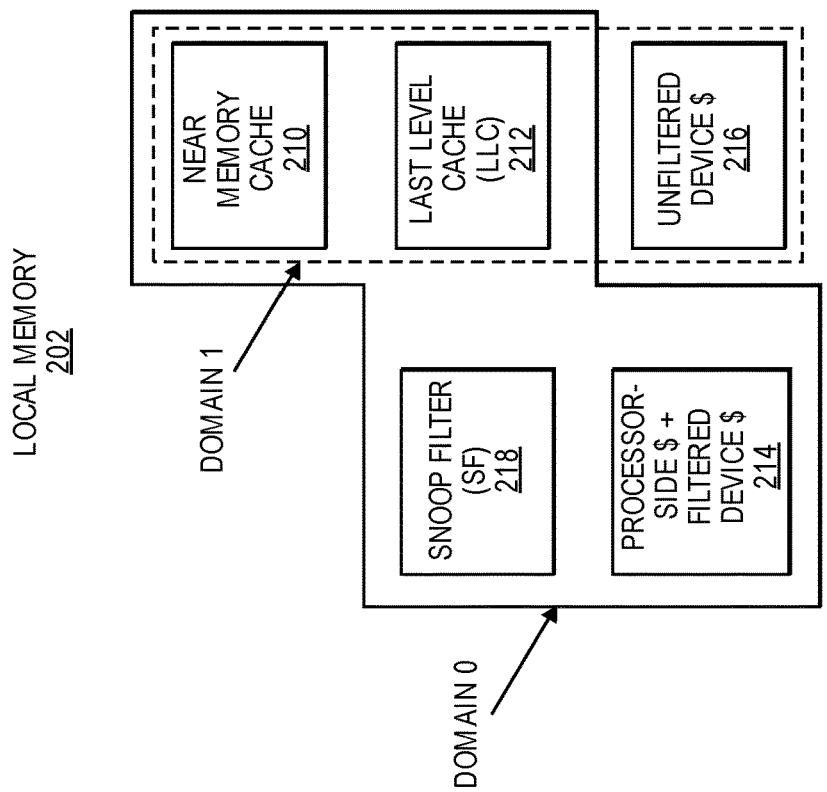
Figure 2B:
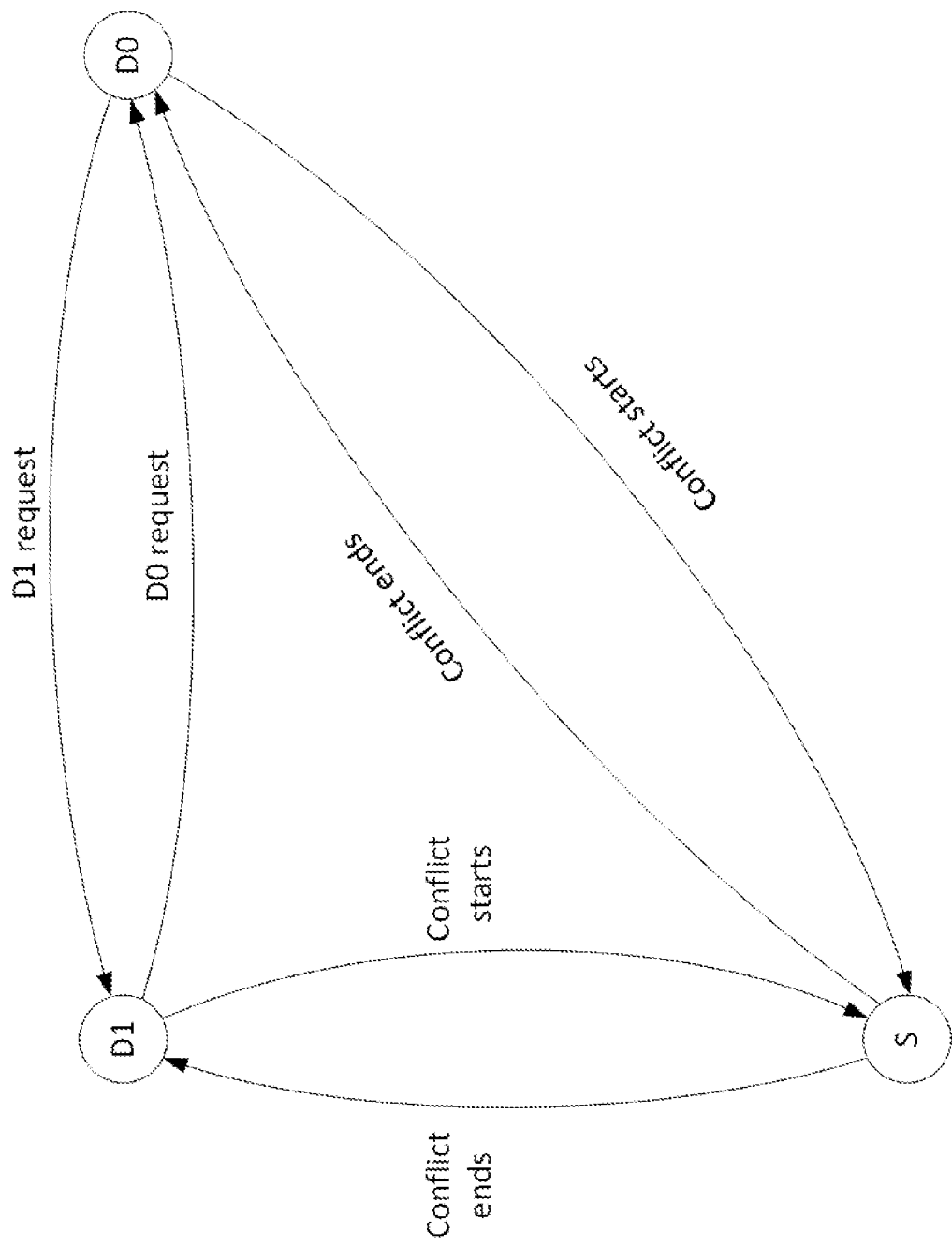
FIG. 2B illustrates an example of a page state transitions state machine diagram.

FIG. 2A illustrates an example of domains, which can also be referred to as cache domains. Cache domains represent logical mapping of system physical caches. FIG. 2A provides an example of a system with two cache domains (D0 and D1), however, more than two cache domains can be defined. In one such example, a given page can have a state indicating the page is mapped to a domain or shared by all domains or shared by a subset of the domains. In one such example, a page can be in one of multiple states, including Shared (S), Domain 0 (D0), and Domain 1 (D1). Different or additional page states can be defined to cover multiple cache domains or optimize for different data sharing patterns. In one example, S and D0 pages are mapped to cache domain 0. In one such example, a D0 page cannot have coherent line copies in cache domain D1. D1 page is mapped to cache domain 1. D1 page cannot have coherent line copies in cache domain D0.

In one example, the majority of pages are either modified by either the host processor or the accelerator, but not both. However, there are some pages (such as pages that include semaphores) that may be concurrently accessed by the host processor and the accelerator. The pages that are being concurrently accessed can be marked as shared. In one such example, because the majority of pages are owned by either the host processor or the accelerator, the PGC manages those pages at a coarse granularity, which can reduce the number of bus transactions involved in maintaining coherence for those pages. Additionally, by marking pages that are concurrently accessed by multiple devices as shared pages, excessive page state transitions can be avoided, and coherency can be maintained by ensuring the cachelines are observed by all coherent caches in the domains included in the shared state.

The example in FIG. 2A illustrates two diagrams: one diagram 202 shows domains defined relative to local memory and another diagram 204 shows the same domains defined relative to remote memory. The terms local and remote memory typically refer to memory in multi-socketed systems (e.g., in a data center or cloud, or on a motherboard, there can be multiple SoCs or chips in sockets that are communicating with one another), and in the context of accelerators coherency, remote memory may refer to memory that is attached to discrete accelerator. From the viewpoint of a given processor or accelerator, the memory that is attached to it is local memory, and memory that is attached to another processor or accelerator is remote memory. For example, from the perspective of a CPU, local memory is directly attached to the CPU or located in far memory. Remote memory is directly attached to a discrete or in-package accelerator or to another CPU in a multi-socket configuration. A local memory page can reside in far memory or in a near memory cache in a 2LM platform. A remote memory page can reside in remote memory or be cached in a near memory cache. Accessing local memory is more direct, whereas accessing remote memory may require multiple hops over an off-die interconnect to reach the remote memory. FIG. 2A is illustrated from the host processor's perspective, and therefore the local memory can be, for example, host-attached memory (e.g., far memory 110) and the remote memory can include the accelerator-attached memory (e.g., accelerator memory 108).

As discussed above with respect to FIGS. 1A and 1B, both the accelerator and host can have one or more caches. In FIG. 2A, the filtered device cache indicates a part of the accelerator-side cache which is tracked in the fabric snoop filter (e.g., the snoop filter 156 of FIG. 1B). The combination of filtered and unfiltered device cache forms the full accelerator-side cache that is coherently covered by the coherent fabric (the accelerator may have additional caches that are managed by software which do not participate in the HW based coherency scheme). The accelerator and host-processor side caches can be partitioned into domains. In the example illustrated in FIG. 2A, domain 0 indicates ownership by the host processor and domain 1 indicates ownership by the accelerator. However, more than one host processor or accelerator device can be mapped to a given domain.

As can be seen in FIG. 2A, for both local memory and remote memory, the combined snoop filter and last level cache (LLC) are inclusive of the host processor's caches and the filtered device cache. For local memory, in the given example, the LLC is exclusive of unfiltered device cache. In addition, in the given example, Domain 1 device write-backs to remote memory do not go through the LLC or near memory cache.

As can be seen in diagram 202, for pages residing in local memory, domain 0 encompasses both host processor side-caches and accelerator-side caches 214, except for a portion of the accelerator side cache that is not tracked by the snoop filter on the host (e.g., the unfiltered device cache 216). For example, cachelines that reside in the local memory can have copies in one or more host processor-side caches. In one such example, cachelines that reside in local memory and are mapped to domain 0 may also have copies in the accelerator-side cache, but only the portion that is tracked by the snoop filter of the host. Cachelines that reside in far memory can have copies in the near memory cache 210 and a last level cache 212. Cachelines that are in pages mapped to domain 0 can be tracked by the snoop filter 218. For pages residing in local memory, domain 1 encompasses the LLC 212, the near memory cache 210, and the unfiltered device cache 216. Therefore, in one such example, cachelines residing in local memory that are in a page mapped to domain 1 can have copies in the near memory cache 210, the LLC 212, and the unfiltered portion of the accelerator cache 216 (e.g., a portion of the accelerator cache that is not tracked by the snoop filter).

Now referring to diagram 204, for pages residing in remote memory, domain 0 can be defined to include the same caches as for pages residing in local memory. However, in the example illustrated in FIG. 2A, pages residing in remote memory and mapped to domain 1 can only have cacheline copies in the unfiltered portion of the accelerator device cache 216. Thus, in the illustrated example, cachelines in pages mapped to D1 that reside in remote memory cannot have copies in the near memory cache, the host processor-side cache(s), and are not tracked by the snoop filter of the host. Thus, when the accelerator accesses its own attached memory (e.g., accelerator memory 108), the request is not snooped by the host's snoop filter and does not need to go through the host (e.g., the accelerator does not need to send any snoop filter lookups to the host). Therefore, by mapping the caches to domains as explained above, requests from the accelerator to access its own attached memory can take full advantage of the accelerator-attached memory's bandwidth and low latencies and still be coherent at the system level.

FIG. 2B illustrates an example of a state transitions state machine diagram. FIG. 2B illustrates a system with three page states: D0, D1, and S. As mentioned above, in one example, the majority of page state transitions are in response to bus transactions. For example, the PGC can cause a page state transition in response to a request for to a page that is not owned or shared by the requesting device, or in response to a conflict in which multiple devices concurrently request access to the same page.

In the illustrated example, if a page is in the D0 state (e.g., owned by the host processor) and the PGC detects a D1 request from the accelerator device, then the PGC can cause a transition to the D1 state. In another example, the PGC can cause a transition to the S state. In the illustrated example, if a page is in the D0 state and the PGC detects a conflict, then the PGC causes the page to transition to the S state.

Similarly, in the illustrated example, if a page is in the D1 state (e.g., owned by an accelerator) and the PGC detects a D0 request from the host processor, then the PGC can cause a transition to the D0 state. In another example, the PGC can cause a transition to the S state. In the illustrated example, if a page is in the D0 state and the PGC detects a conflict, then the PGC causes the page to transition to the S state.

In one such example, whether the PGC causes a page to transition from D0 or D1 to the shared state or to another domain depends on factors such as the number of conflicts detected, the number of page state transitions in a given period of time, or other factors. In one such example, the PGC can monitor the number of page state transitions for a given page over a period of time, and if the number of transitions is below a threshold, the PGC causes the transition to the domain mapped to the requesting device, and if the number of transitions is above or equal to a threshold, the PGC causes a transition to the shared state. Thus, FIG. 2B illustrates one example of a page state transitions state diagram, however, different or other page states and/or transitions are possible.

Figure 3:
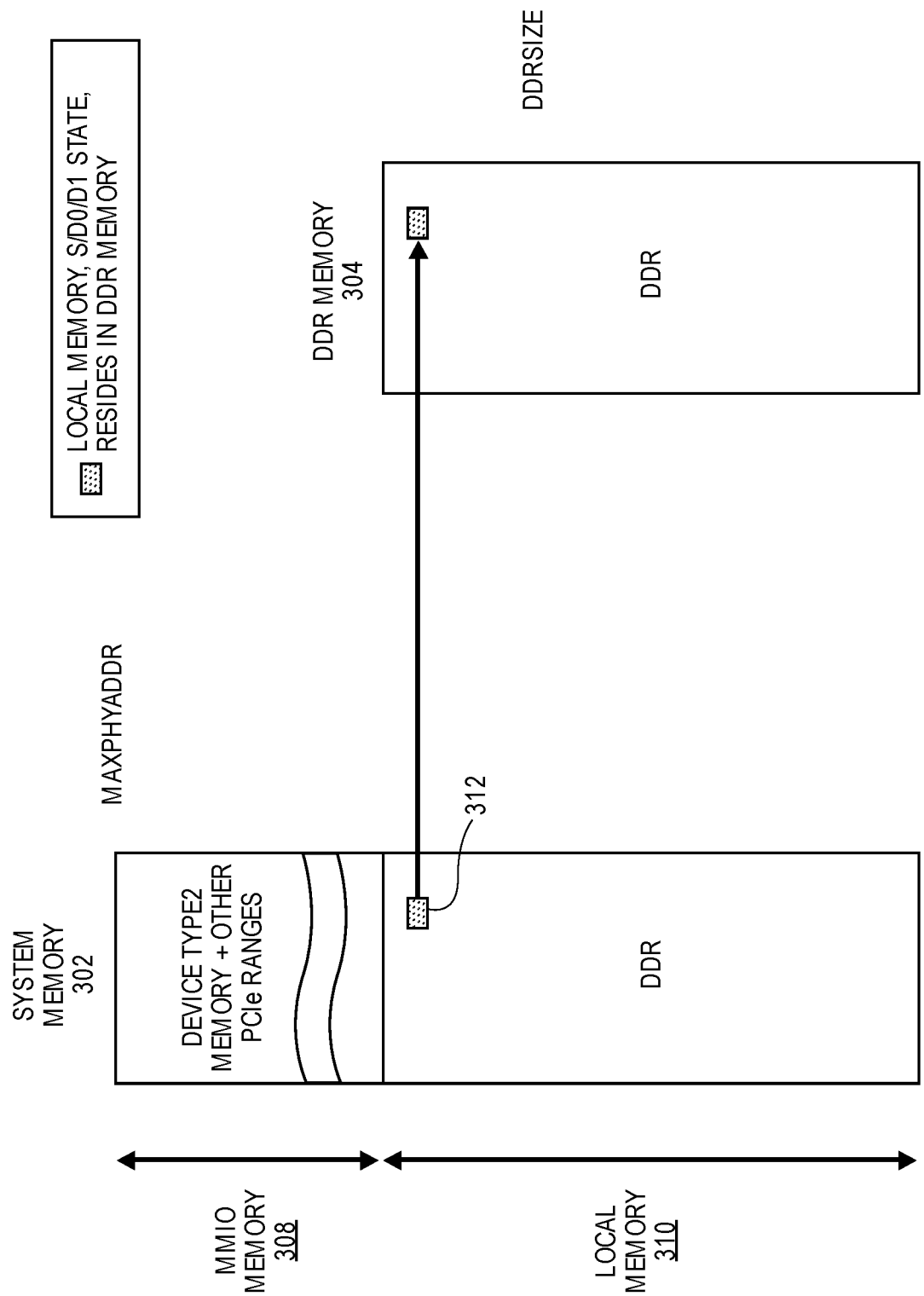
FIG. 3 illustrates an example of a page mapping for a 1LM (one level memory) system including a UMA (uniform memory access) device.
Figure 4:
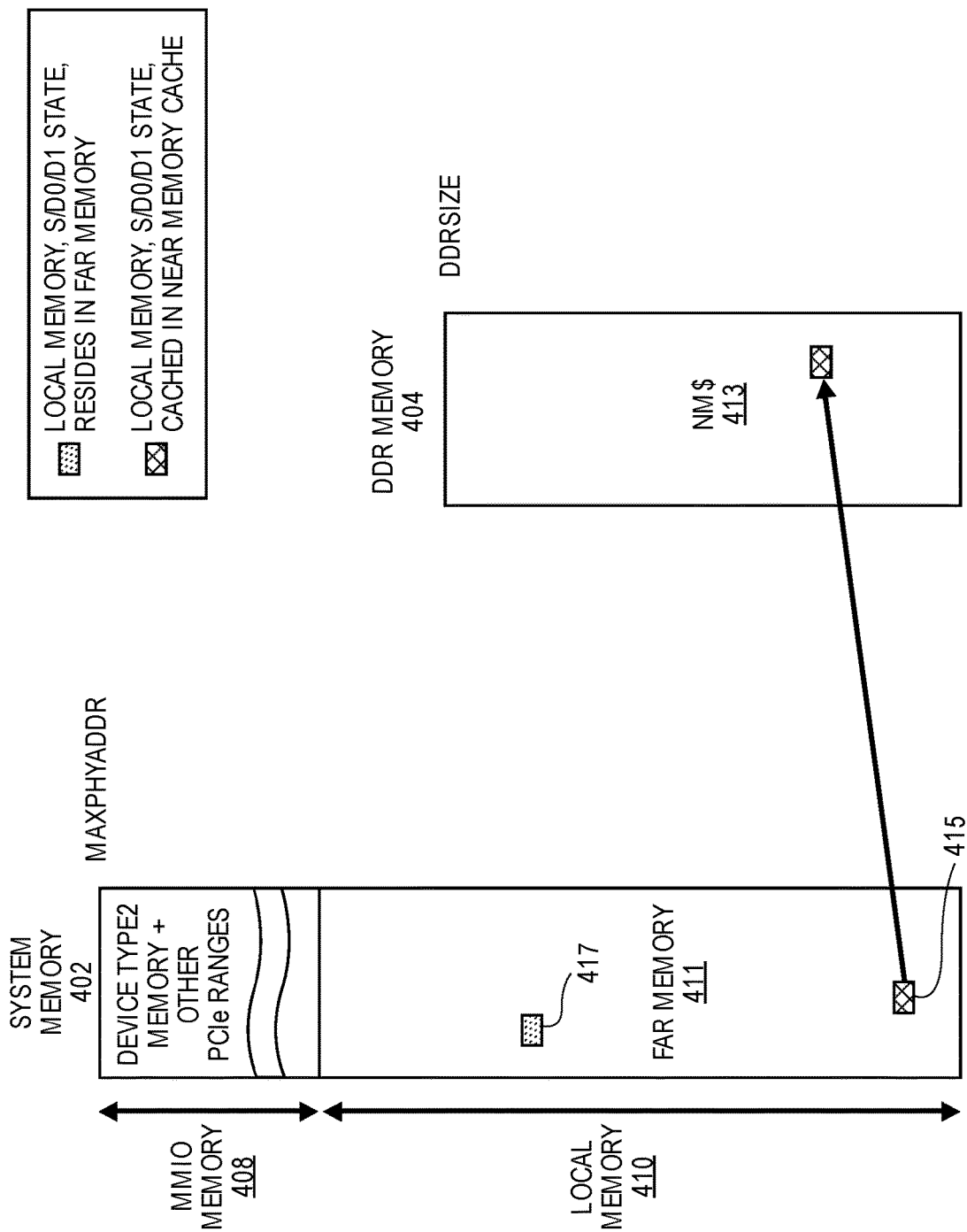
FIG. 4 illustrates an example of a page mapping for a 2LM (two level memory) system including a UMA device.
Figure 5:
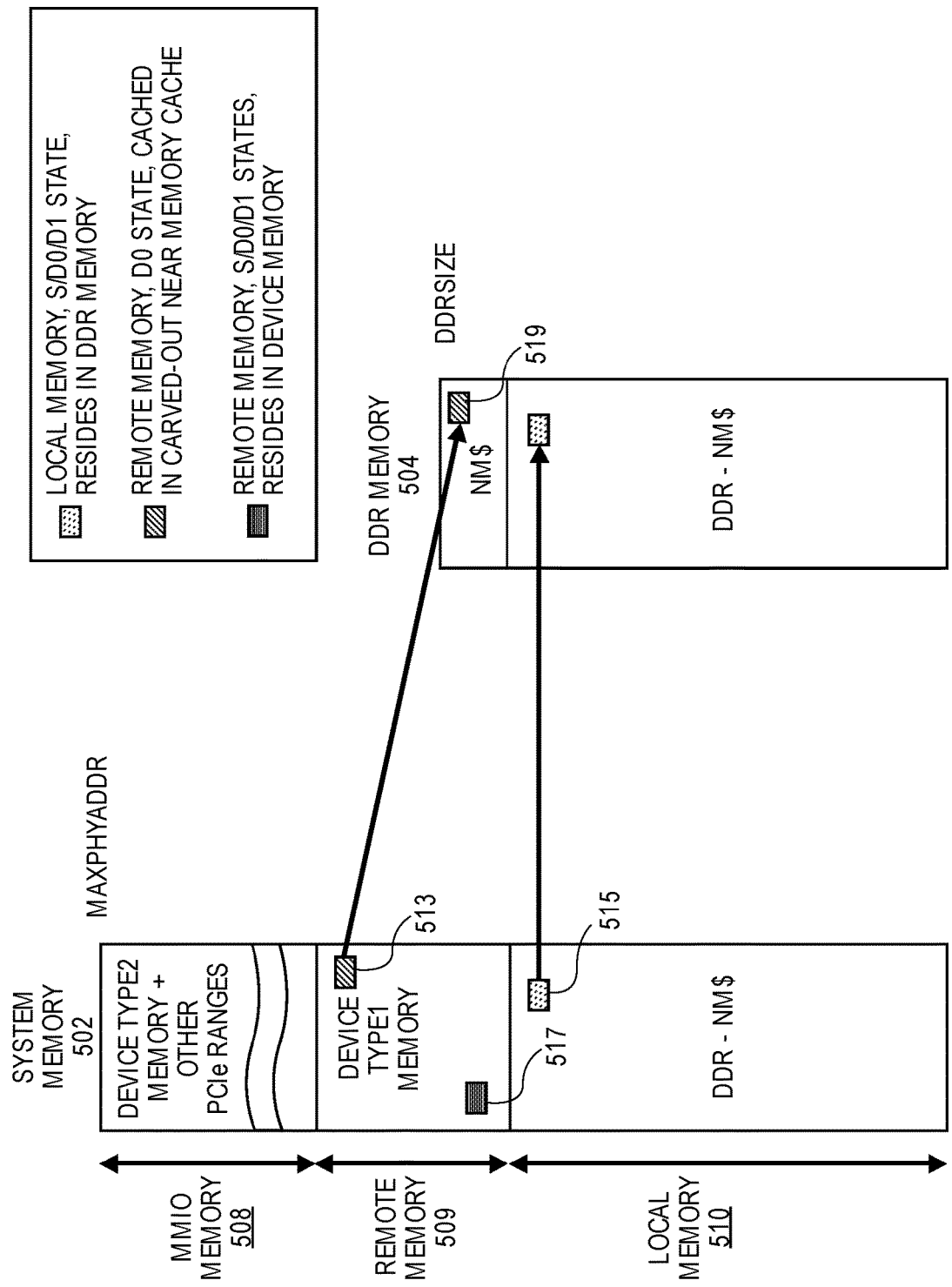
FIG. 5 illustrates an example of a page mapping for a 1LM system including a NUMA (non-uniform memory access) device.
Figure 6:
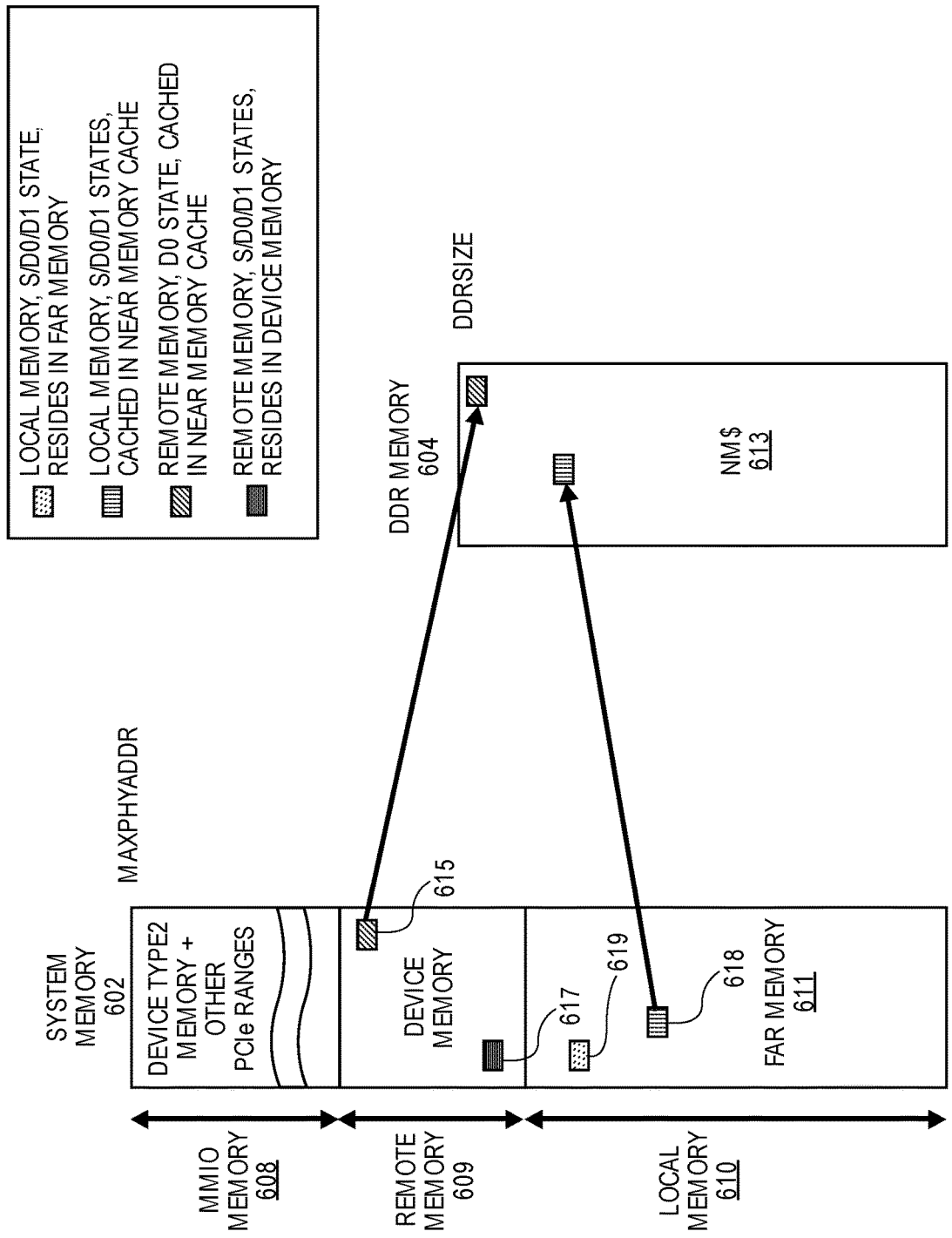
FIG. 6 illustrates an example of a page mapping for a 2LM system including a NUMA device.

FIGS. 3-6 illustrate examples of page mappings for various memory hierarchies. In FIGS. 3-6, the left column represents system memory, which can include the memory that is exposed to the operating system. The right column illustrates the DDR memory that is attached to the host (e.g., DDR memory which typically serves as host memory in 1LM systems and typically serves as near memory cache in 2LM systems.). For illustration purposes, specific memory regions that may be stolen from the operating system such as tag store and page state table are omitted from the diagrams. In addition, for illustration purposes, persistent memory is also omitted from the given diagrams. Persistent memory can mostly use the same far memory control logic with several needed additions for file system commit points. FIGS. 3 and 4 illustrate examples of page mappings for systems including a UMA (uniform memory access) device, and FIGS. 5 and 6 illustrate examples of page mappings for systems including a NUMA (non-uniform memory access) device. A UMA device is a coherent device, either integrated, on-package, or discrete, that has no dedicated memory attached. For example, a UMA device can be an accelerator without memory attached (e.g., the accelerator 104 of FIG. 1A but without the accelerator memory 108 coupled with it). In contrast, a NUMA (Non-Uniform Memory Access) device is a coherent device, typically on-package, or discrete, that has dedicated memory attached. For example, the accelerator 104 of FIG. 1A coupled with the accelerator memory 108. A system may have one or more UMA devices, one or more NUMA devices, or both UMA and NUMA devices. An example of a system with both UMA and NUMA devices is a client switchable graphics use-case with an integrated graphics device as the UMA device and an in-package or discrete graphics device, which typically has higher compute abilities, as the NUMA device. Also, for FIGS. 3-6, accelerator device attached memory is shown as being partitioned to type 1 and type 2 memories. Device type 1 memory is called remote memory (from the perspective of the host) and is mapped to system coherent address space that is accessible to the host using standard write-back semantics. Device type 2 memory is typically not mapped to system coherent address space or directly accessible to the host. Device type 2 memory is treated as private memory by the accelerator device.

FIG. 3 illustrates an example of a page mapping for a 1LM (one level memory) system including a UMA device. In the example illustrated in FIG. 3, the system memory 302 includes the local memory 310 and MMIO (memory mapped input/output) memory 308. The local memory 310 is the host-attached memory, which, in this example, is the same as the DDR memory 304. However, the local memory 310 can include other or additional host attached memories. The MMIO memory 308 includes device type 2 memory and/or registers of the accelerator device. Some or all of the MMIO memory 308 can be mapped to system memory addresses for ease of access (e.g., ease of reading and writing registers of the accelerator by the host CPU or other processor). In other examples, the MMIO memory range is not mapped to system memory addresses and not accessible by the host CPU and is a memory range accessible only by the accelerator device.

FIG. 3 illustrates a page 312 of data, which is stored in local memory 310, and therefore resides in the DDR memory 304 in this example. In this example, the page 312 can be in one of three states: shared, D0 (domain 0), and D1 (domain 1). The shared state indicates that the page is shared between two (or more) domains. In this example, the shared state indicates that the page is shared between D0 and D1. Thus, in this example, the shared state also indicates that the page is shared and accessible by both the host processor and the accelerator device. Also, if the page in the shared state, there can be cached copies of cachelines in the page in caches on the accelerator side or the host processor side. Thus, in the illustrated example, there can be copies of the cachelines of the page 312 in a filtered portion of the accelerator-side cache (e.g., the accelerator-side cache 114 of FIG. 1A), the host processor-side cache (e.g., the processor-side cache 116 of FIG. 1A), and the last level cache (e.g., the LLC 152 of FIG. 1B). In one example, if the page 312 is in the shared state or the D0 state, the snoop filter (e.g., the snoop filter 156 of FIG. 1B) would also track any recently accessed cachelines of the page 312.

In one example, if the page 312 is in the D0 state, the page is owned by the host processor. Therefore, in one such example, the page 312 would be accessible by the host processor, but not accessible by the accelerator without a page state transition. In specific implementations, the device may have the ability to explicitly generate D0 requests when accessing cache-lines within selected pages of its choice (e.g., a subset of the total system memory pages). In one such example, such requests will not trigger a page state transition when hitting a page in D0 state, and will result in setting the host coherent fabric snoop filter for the requests and caching of the cacheline in the filtered portion of the accelerator cache. If the page 312 is in the D0 state, there can be copies of cachelines of the page 312 in the host processor-side cache (e.g., the processor-side cache 116 of FIG. 1A), and the last level cache (e.g., the LLC 152 of FIG. 1B), but not in the unfiltered portion of the accelerator-side cache.

In one example, if the page 312 is in the D1 state, the page is owned by the accelerator device. Therefore, in one such example, the page 312 would be accessible by the accelerator device, but not accessible by the host processor without a page state transition. If the page 312 is in the D1 state, there can be copies of cachelines of the page 312 in an unfiltered portion of the accelerator-side cache (e.g., the accelerator-side cache 114 of FIG. 1A), but not the host processor-side cache (e.g., the processor-side cache 116 of FIG. 1A). Copies of cachelines in the unfiltered portion of the cache are not tracked or observed by the snoop filter in the coherent fabric of the system. For example, referring to FIG. 1A, the accelerator-side cache 114 may have some portion that is tracked in the snoop filter 120, and some portion that is not tracked in tracked in the snoop filter 120. However, in the given example, the page resides in the host processor's local memory 310, therefore copies of the cacheline can also be present in the last level cache (e.g., the last cache checked for the cacheline before accessing the cacheline in memory).

Like FIG. 3, FIG. 4 illustrates an example of a page mapping for a system including a UMA device. However, FIG. 4 differs from FIG. 3 in that is illustrates a 2LM system. System memory 402 includes MMIO memory 408 and local memory 410. In the illustrated example, the local memory 410 includes the far memory 411 and the DDR memory 404 operates as a near memory cache 413. Thus, some pages in the far memory 411 (such as page 415) may be cached in the near memory cache 413. Other pages, such as page 417, may not be cached in the near memory cache 413. Each page in the local memory 410 can be in any state (in the illustrated example, in the S, D0, or D1 state). Therefore, the potential locations of copies of cachelines of the pages in the local memory 410 are similar to those described with respect to FIG. 3, with the addition of the near memory cache 413. In the illustrated example, pages of any state (e.g., S, D0, and D1) can have cachelines cached in the near memory cache 413.

FIG. 5 is similar to FIG. 3 in that it illustrates an example of page mapping in a 1LM system, but unlike FIG. 3, FIG. 5 illustrates an example of a page mapping for a NUMA (non-uniform memory access) device. Therefore, in addition to the system memory 502 including the local memory 510, system memory 502 also includes the remote memory 509. In this example, the DDR memory includes a region 519 that is carved out to operate as a near memory cache for pages that reside in remote memory and which are being accessed by the host processor. The size of the carved out near memory cache region 519 is implementation specific and may be exposed to software for performance tuning. Also, the carved out near memory cache region 519 may be based on range registers for continuous space mapping, or any other mapping function.

Thus, in this example, the local memory 510 includes the portion of the DDR memory that is not carved out for a near memory cache. The remote memory 509 can be, for example, an accelerator-attached memory such as the accelerator memory 108 of FIG. 1A. The remote memory 509 is type 1 memory, and thus is mapped to system coherent address space and is accessible to both the accelerator device and the host. The MMIO memory 508 includes device type 2 memory and/or registers of the accelerator device and can be similar to or the same as the MMIO memory 308 described above with respect to FIG. 3. The size of the coherent system memory is larger than in the examples with the UMA devices because the coherent system memory includes at least a portion of the DDR memory 504 and the device type 1 memory. For example, if the DDR memory is X GB, the remote memory is Y GB, and the carved-out portion of the DDR memory to operate as a near memory cache is Z GB (where typically Z would be much smaller than Y), then the size of coherent system memory would be X+Y−Z GB. Thus, unlike conventional systems in which the coherent system memory would be X GB (the size of the DDR memory 504), in this example, the coherent system memory is larger due to including the device memory.

In the example illustrated in FIG. 5, pages in system memory can reside in the remote memory 509 and in the local memory 510. Page 515 is an example of a page residing in local memory. In one example, the page 515 can be in the S, D0, or D1 states. In one example, if the page 515 is in the D0 state, the host processor owns the page. Thus, in one such example, the host processor can access the page 515, but the accelerator device cannot access the page without a page state transition. If the page 515 is in the D0 state, copies of the cachelines of page 515 can be in a filtered portion of the accelerator-side cache (e.g., the accelerator-side cache 114 of FIG. 1A), the host processor-side cache (e.g., the processor-side cache 116 of FIG. 1A), and the last level cache (e.g., the LLC 152 of FIG. 1B). In this example, the page 515 in the D0 state would also be tracked in the snoop filter.

If page 515 is in a S state, both the host processor and the accelerator device can access the page. In one example, potential locations for cached copies of cachelines of the page 515 are the same for the S and D0 state. For example, if in the S state, copies of cachelines of the page 515 can be in the host processor-side cache, filtered portion of the accelerator-side cache, LLC, and are tracked in the snoop filter.

In one example, if the page 515 is in the D1 state, the page is owned by the accelerator device. Therefore, in one such example, the page 515 would be accessible by the accelerator device, but not accessible by the host processor without a page state transition. If the page 515 is in the D1 state, there can be copies of cachelines of the page 515 in an unfiltered portion of the accelerator-side cache (e.g., the accelerator-side cache 114 of FIG. 1A), but not the host processor-side cache (e.g., the processor-side cache 116 of FIG. 1A). However, in one example, copies of the cacheline can also be present in the last level cache (e.g., the last cache checked for the cacheline before accessing the cacheline in memory).

Page 517 is an example of a page residing in remote memory 509. The page 517 can be in states S, D0, and D1. In one example, if in the D0 or S states, the potential locations of cached copies of cachelines of the page are the same as for the page 515 in local memory in the D0 and S states. If the page 517 is in the D1 state, then the page 517 is owned by the accelerator device. In one such example, if the page 517 is in the D1 state, then copies of cachelines of the page 517 can only be in the unfiltered portion of the accelerator cache 216 (and not in the host processor-side cache, LLC, and not tracked by the snoop filter and not residing in the near memory cache). Thus, the accelerator can access pages in its own memory that are owned by the accelerator device without needing to snoop or go through the host. Thus, if accelerator device accesses the accelerator-side cache and receives a cache miss, the accelerator device does not need to send snoop filter lookups external to the accelerator cache and can still be coherent at a system level. Eliminating snoops for memory accesses to the remote memory to pages in the D1 state can enable the accelerator device to take advantage of the bandwidth of the accelerator-attached memory and still maintain coherency. Accelerator-attached memory is often high bandwidth and low latency, so enabling the accelerator device to take full advantage of the high bandwidth capabilities of the accelerator-attached memory can lead to significant performance improvements.

The page 513 is an example of a page that resides in remote memory that is in the D0 state. As mentioned above, the example illustrated in FIG. 5 includes a portion 519 of the DDR memory 504 that is carved out to operate as a near memory cache for the remote memory 509. Therefore, if a page (e.g., page 513) resides in the remote memory 509 and is in the D0 state and is being accessed by the host processor, copies of cachelines of page 513 being accessed by the processor may be stored in the portion 519 reserved or the near memory cache. Note that in the illustrated example, the page 513 is in the D0 state (but not the D1 or S states). In the illustrated example, because the page 513 resides in remote memory 509, if the page 513 were in the D1 or S states, the page 513 would not be cached in the near memory cache 519 (but can be cached in the LLC and processor core caches if it were in the S state). In contrast, D0 pages can be cached in the near memory cache in addition to the LLC and the processor core caches.

FIG. 6 illustrates an example of a page mapping for a 2LM system including a NUMA device. The system memory 602 includes MMIO memory 608, remote memory 609, and local memory 610. The system illustrated in FIG. 6 includes remote memory 609 and local memory 610. In this example, the local memory 610 includes far memory 611. In one such example the DDR memory 604 can operate as a near memory cache 613. The remote memory 609 can include accelerator-attached memory, such as the accelerator attached memory described above. Thus, data in system memory can reside in remote memory 609 or the local memory 610.

Pages 618 and 619 are examples of pages that reside in local memory. In the illustrated example, the pages 618 and 619 reside in far memory 611 and are cacheable in the near memory cache 613. Page 618 is an example of a page residing in far memory 611 and cached in the near memory cache 613. The pages 618 and 619 can be in the state S, D0, or D1. The potential locations of cached copies of cachelines in the pages 618 and 619 are the same as for the pages 417 and 415 described above with respect to FIG. 4.

Page 615 is an example of a page that resides in remote memory 609 in the D0 state. In this example, the page 615 is cached in the near memory cache 613. The near memory cache may be either fully shared by far and remote memories, statically partitioned, or having any other partitioning scheme.

Page 617 is another example of a page that resides in remote memory 609. In this example, the page 617 can be in the S, D0, or D1 states. In one such example, the potential locations of cached copies of cachelines of page 617 are similar to or the same as for the page 517 of FIG. 5.

Thus, the techniques described herein can apply to a variety of systems, including systems with one level memory or multi-level memory, systems with NUMA devices and/or UMA devices. Furthermore, as mentioned above, although the examples are described in terms of a system with a host processor and an accelerator device, the techniques described herein applies to other topologies such as systems with multiple host processors and/or multiple accelerator devices and systems with multiple host processors but no accelerator devices.

FIG. 7A illustrates an example of a page state table and entry encoding example. The page state table in FIG. 7A illustrates one possible way to track the ownership state of memory pages. The PGC may track page information in 4KB page granularity through a page state table. The page state table can be tracked in hardware, software, or both. In one example, the page state table is a memory data structure or directory that holds page coherency state information in system memory that is mapped to the PGC and cannot be directly accessed by software. Different page tracking operational modes can be defined, for example, a 2 domains mode may include up to 2 cache domains.

For efficient memory accesses, both the device and host may implement on-die page coherent state tracking structures. The page state table illustrates an example with two state bits (e.g., ownership state bits), S0 and S1. The state bits may also be referred to as control bits or metadata bits. Although the illustrated example shows two bits being used to track state, more than two bits may be used, and it may also be possible to track state with 1 state bit. In the illustrated example, a "00" indicates the page is in a shared state, "01" indicates the page is in the D0 state, and "10" indicates the page is in the D1 state. In the illustrated example, the value "11" may indicate another state or may be reserved. The values in the page table of FIG. 7A are a nonlimiting example. Other values may indicate different or additional states. The state bits can be used by the PGC to determine how to handle requests. For example, the PGC can take different actions when a memory reference hits S page, D0 page, or D1 page. For example, the PGC can initiate a page state transition when a D1 request hits a D0 page (for example, the transition would be to either D1 or S states, dependent on PGC configuration and internal heuristics). The PGC may avoid a page state transition when a D1 request hits an S page, while returning an indication back to the device that its request to have a page mapped to D1 was not granted, but that it can still use the cache-line he requested in MESI state as any other coherent cacheline.

In one example, the state bits S0 and S1 can be included for each entry in a structure used for mapping two level memory. For example, a system that supports two level memory can include a structure (either on die, in memory, or both) that maps the data in the near memory cache to the location of the data in far memory. Typically, the mapping is done at a page granularity, so that a page in the near memory cache is mapped to the location of the page in far memory. Mapping can be accomplished by storing a pointer or address (or tag or portion of an address) indicating the locations of a page in both far memory and near memory. In one such example, each entry can also include one or more ownership state bits.

In one example, a structure is stored in memory that includes location information (e.g., 2LM mapping information) and ownership state information for each page in memory. For example, as indicated in FIG. 7A, if the size of system memory is X bytes, and the number of 4 kB pages is N=X/4K (where K=1024) (rounded up), then there are N entries in the structure. The size of the page state table in this example would be X/16K.

In one example, the PGC can track recently accessed pages' coherent states in two structures: an on-die tag-cache and one or more off-die tag-store structures. The tag-cache holds tag and page state information for most recently accessed pages. In one such example, the tag indicates the location of the page in the memory hierarchy. The tag-store (and/or page state table) holds tag and page state information for all pages that are cached in near memory cache. When a page is evicted from near memory cache, its coherency state will remain tracked in the page state table. In other examples (e.g., for 1LM systems), there is only one off-die structure (e.g., only one page state table/tag store in memory to store state for all memory pages).

Thus, the same structures can be used to track both the location of pages and the ownership state, and the same controller (e.g., a page level controller such as the PGC 112 of FIG. 1A) can be used to manage both multi-level memory and ownership state. The host or device may also expose a software interface that enables either implicit or explicit page state transitions. For example, when OS boots and enumerates PCIe devices with hardware coherency capability, the OS may initialize the page state table and assign each coherent device a device index. This index can then be used by the PGC to identify needed page state transitions. In one such example, the PGC can be exposed to the OS as a Root-Complex integrated end-point, which publishes through its PCIe configuration space the maximum number of coherent devices it can support.

FIG. 7B illustrates an example of information stored in a snoop filter, including a domain bit. As mentioned above, the snoop filter is typically an on-die directory that identifies potential locations of cached copies of cachelines. The snoop filter is typically not large enough to track cache coherency information for every cacheline in system memory. Therefore, at any given time, a subset of cachelines (such as the most recently accessed cachelines) are allocated and tracked in the snoop filter.

Snoop filters typically include a tag to identify the location of a cacheline, one or more coherency state bits to indicate the state of the cacheline (e.g., modified, exclusive, shared, invalid, or other states), and one or more valid bits (e.g., one valid bit for each caching agent that may have a copy of the line). In one example, the valid bits indicate caching agents that may have D0 cache-line copies. In addition to these bits, in one example, the snoop filter also includes one or more domain bits (D bits). In one such example, the domain bit indicates whether the corresponding cacheline is in a page mapped to D1. For example, if the domain bit is set (asserted) it is an indication that the cacheline is in a page in the D1 state, and if the domain bit is not set it is an indication that the cacheline is in a page in the D0 or shared states.

In one example, if the D bit for a cacheline is asserted, then no valid bits can be set for the cacheline. In one such example, this is due to the last level cache being defined as exclusive of any unfiltered portions of device caches. Thus, if a cacheline written to the LLC is in a page mapped to the D1 state, the D bit for that cacheline is set and the valid bits are cleared. In another example, if the D bit is asserted, the valid bits can be used to indicate the caching agent that wrote the line to the LLC. The cacheline could also be said to be deallocated from the snoop filter even though the D bit for the cacheline may be asserted in the snoop filter entry because the LGC is not tracking the cacheline if the D bit is set. However, in other examples, the D bits are stored and tracked in a structure separate from the snoop filter. The coherent fabric can infer domain mapping for device owned write-back based on the valid bits. In one such example, an untracked cache line indicates a D1 write-back.

Figure 8:
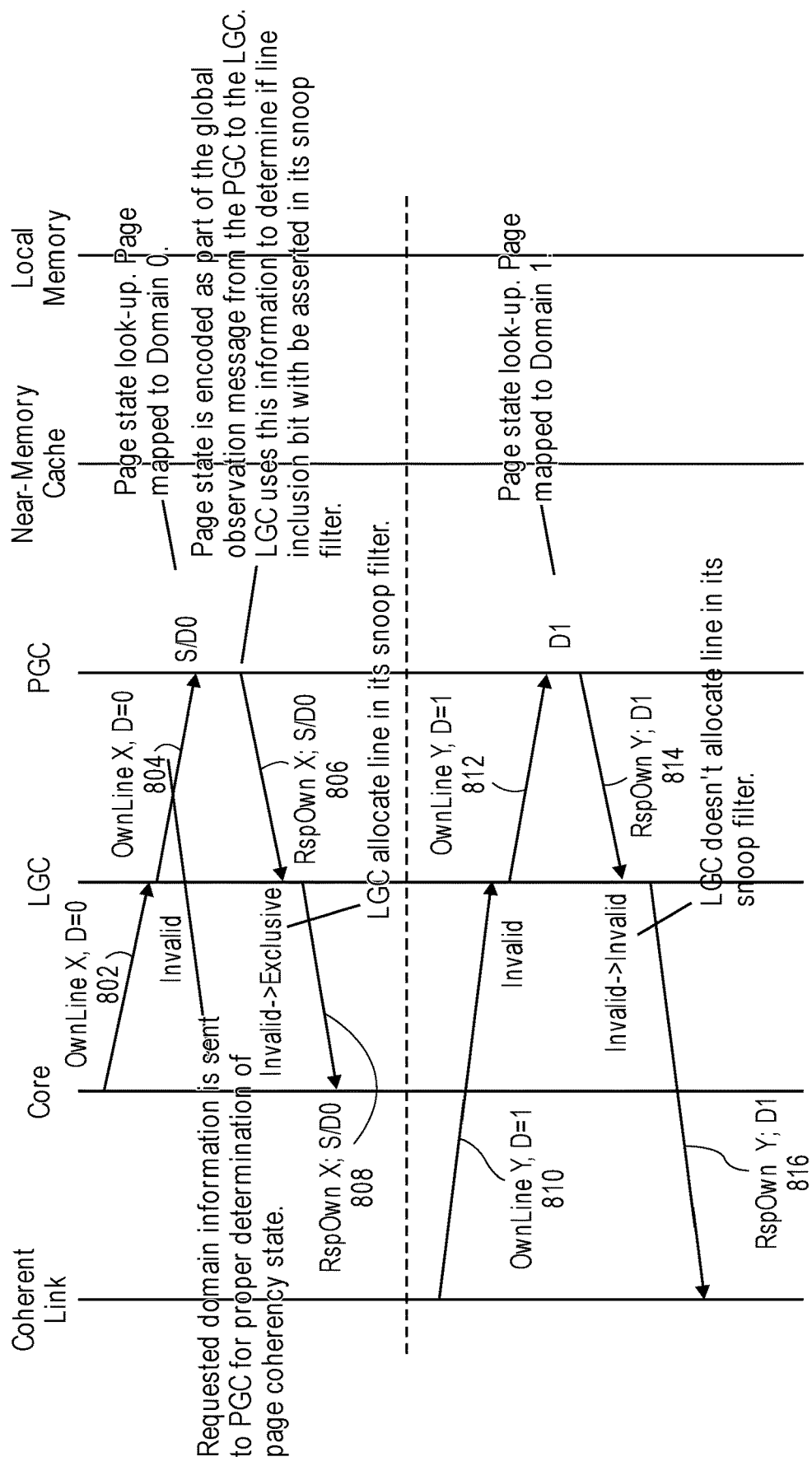
FIG. 8 illustrates a diagram showing an example of host and device cacheline ownership transactions.

FIG. 8 illustrates a diagram showing an example of host and device bus masters cacheline ownership transactions. The given method for managing coherent links and multi-level memory affects handling of bus transactions by the coherent fabric. The host request to address X is mapped to Domain 0 and the device request to address Y is mapped to Device 1. Therefore, no page state transitions are needed as a result of the transactions illustrated in FIG. 8.

Referring to FIG. 8, core (e.g., a host processor mapped to D0) requests ownership of the cacheline at address X, at transaction 802. The line granular controller (LGC) first attempts to handle the request. In this example, the LGC is unable to handle the request (e.g., due to the state of the cacheline being marked as invalid in the snoop filter). Therefore, the LGC forwards the request to the PGC for further handling, at transaction 804. The PGC receives the snoop filter miss and performs a page state look-up. In one example, the PGC first checks the tag cache to see if the page that includes the cacheline is allocated in the tag cache. If so, the PGC determines the page state from the tag cache (e.g., the state bits in the tag cache). In one such example, if the PGC determines that the page is not in allocated in the tag cache, the PGC determines the page state from the tag store and/or page state table. In the illustrated example, the PGC determines that the page is mapped to D0. Therefore, the PGC determines that no page state transition flow is required. The PGC then communicates the requested page's state to the LGC and the requesting bus master, at transactions 806 and 808. For example, the page state can be encoded as part of a coherent message response (e.g., a global observation message) from the PGC to the LGC. In one such example, the coherent fabric (e.g., via the LGC) logs domain indication for reads based on global observation messages from the PGC. PGC global observation message can include both cache-line coherency state and page state. Additionally, delivery of page state back to the device can be used for performance monitoring and optimizations.

In one example, while the coherent fabric allocates lines that belong to S or D0 pages in the LGC snoop filter, it doesn't allocate lines that belong to D1 pages in the LGC snoop filter. Not tracking device owned pages in the fabric LGC snoop filter can minimize the cost associated with the coherency protocol. Thus, the LGC can then use the page state information to determine if the cacheline should be allocated in the snoop filter and whether the D bit should be asserted or cleared. In this example, the page is mapped to D0, so the LGC allocates the cacheline in its snoop filter and modifies the coherency state of the cacheline from invalid to exclusive. The LGC also clears or sets the D bit to indicate that the page is not mapped to D1.

FIG. 8 also illustrates an example of an accelerator device mapped to D1 requesting address Y via a coherent link, at transaction 810. For example, referring to FIG. 1A, the accelerator 104 sends a request to the LGC 118 of the host 102 via the coherent link 122. The LGC first attempts to handle the request. In this example, the LGC is unable to handle the request (e.g., due to the state of the cacheline being marked as invalid in the snoop filter). Therefore, the LGC forwards the request to the PGC for further handling, at transaction 812. The PGC receives the snoop filter miss and performs a page state look-up (e.g., in a tag cache, tag store, and/or page state table). In the illustrated example, the PGC determines that the page is mapped to D1. Therefore, the PGC determines that no page state transition flow is required. The PGC then communicates the requested page's state to the LGC and the requesting bus master, at transactions 814 and 816. In this example, the LGC snoop filter does not allocate the cacheline in its snoop filter because the line is in a page mapped to D1. Thus, the LGC snoop filter marks the page invalid. The LGC also sets the D bit for the cacheline to indicate that the page is mapped to D1.

Although FIG. 8 illustrates an example of an accelerator mapping its requests to D1, in one example, an accelerator may also map part of its requests as D0 requests. For example, if an accelerator has internal logic that identifies certain pages as shared pages, the accelerator can map requests to those pages as D0 requests (e.g., to avoid a transition to the D1 state).

Figure 9:
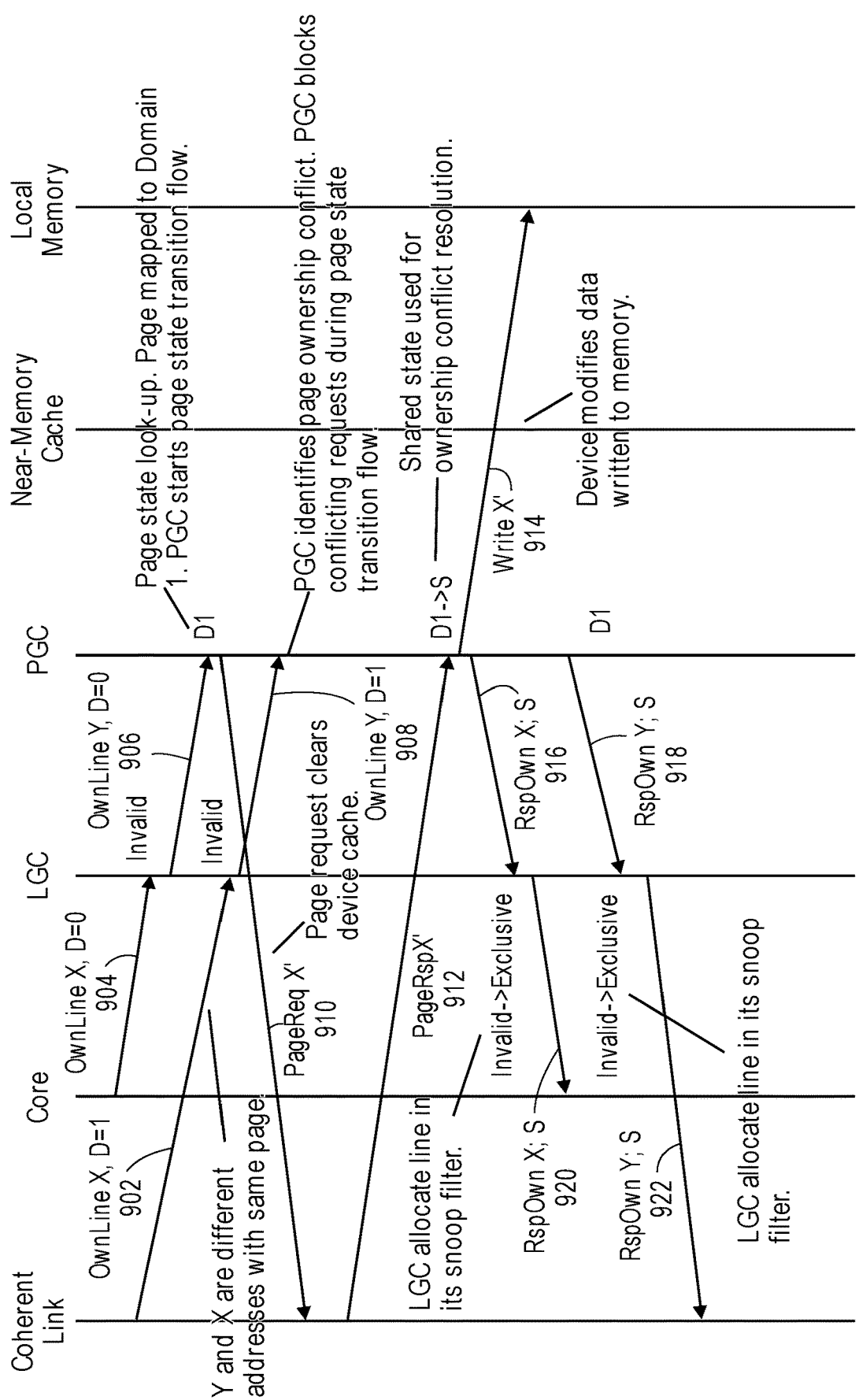
FIG. 9 illustrates a diagram showing an example of a page ownership conflict.

FIG. 9 illustrates a diagram showing an example of a page ownership conflict. In the illustrated example, the host sends a request to address X, which triggers a page state transition flow. The accelerator device sends a request to access to address Y within the same page, which the PGC identifies as page ownership conflict. The PGC can then block handling of device request to address Y until the page state transition is over and the request to address X is completed. The PGC performs a transition to the S state and serves the request to address Y. The PGC can then exit the conflict state for the page and complete the targeted transition to D0 state.

For example, referring to FIG. 9, the accelerator sends a request for ownership of the cacheline at address Y via a coherent link, at transaction 902. The core (e.g., host processor) sends a request for ownership of the cacheline at address X, which is in the same page as address Y, at transaction 904. Both requests are received by the LGC. In the illustrated example, the LGC is unable to handle the requests (e.g., due to the cachelines being invalid in the snoop filter). Therefore, the LGC sends the requests to the PGC, at transactions 906 and 908. In response to the request from the host, the PGC performs a page state look-up and determines that the page is mapped to D1. Therefore, the PGC starts a page state transition flow in order to service the request received from the host processor.

One way to handle a conflict such as this where two agents are trying to access the same page is to handle one request in one domain (e.g., D0) while blocking the other request, and then transition to the second domain (e.g., D1) to handle the other request. However, page state transitions can have significant overhead (e.g., due to snoops or cache flushes for all the cachelines in the page). Therefore, instead of switching back and forth between states D0 and D1, the PGC can identify the page as a shared page. The PGC can cause a page to transition to the shared state in response to detecting a single concurrent access, or after detecting that the number of concurrent accesses has reached or exceeded a threshold. Other triggers can also cause the PGC to mark a page as shared, such as an explicit request from the OS or software.

In the example illustrated in FIG. 9, the PGC causes the page to transition to the shared state after detecting the request to access address X from the host processor and the concurrent request to access address Y from the accelerator. As part of the page state transition flow, the PGC sends a page request that clears the page from the accelerator device's cache, at transaction 910 (where X' indicates the transaction is done in page granularity and not cacheline granularity, e.g., the PGC sends sixty four cacheline snoop invalidations for the entire page). By sending the request to clear the page from the accelerator device's cache, the PGC can ensure there are no cached copies in the non-filtered portion of the accelerator cache. The accelerator device then sends a page response to the PGC to indicate that its caches have been cleared of cachelines from the page, at transaction 912. The PGC can then update the page's ownership state to a shared state S, which can be used for ownership conflict resolution. The PGC may also modify the data written to memory, at transaction 914. After transitioning to the shared state, the PGC can send a response to the LGC that the page is in the shared state, and that the host and accelerator device can access the requested cachelines, at transactions 916 and 918. The LGC then allocates the cachelines at addresses in the snoop filter indicate that the cachelines are in the exclusive state. The LGC can also clear the D bits because the page is not in the D1 state. The LGC then sends a response to the host and accelerator device indicating the host and accelerator device can proceed with the requested access, at transactions 920 and 922.

Thus, instead of transitioning back and forth between two states, in one example, the PGC can mark the page as a shared state to be observed by all coherent caches, which can enable concurrent accesses without the overhead of multiple page transitions.

Figure 10:
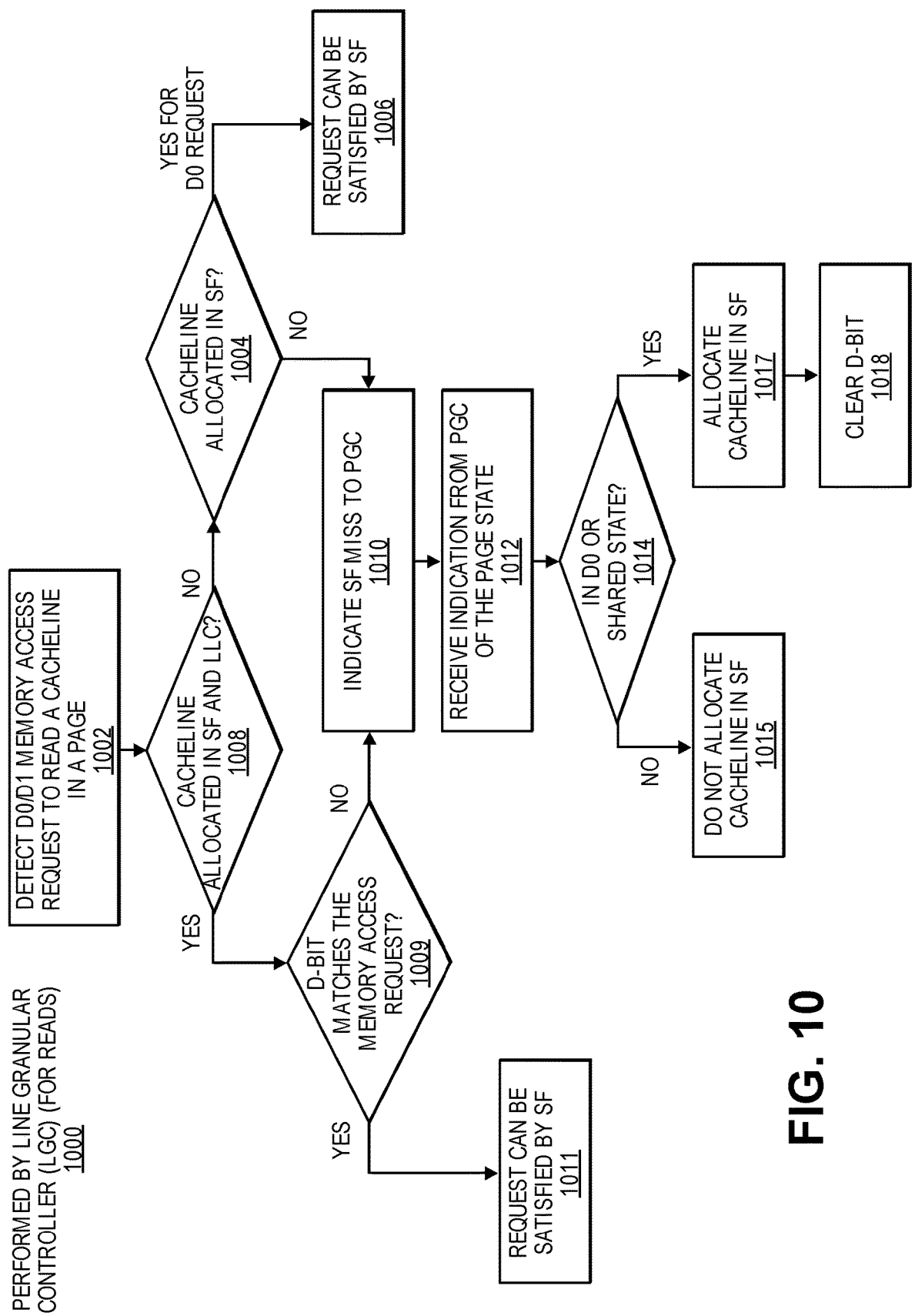
FIG. 10 illustrates a flow chart of a method performed by a line granular controller (LGC) responsive to detection of a memory read request.
Figure 11:
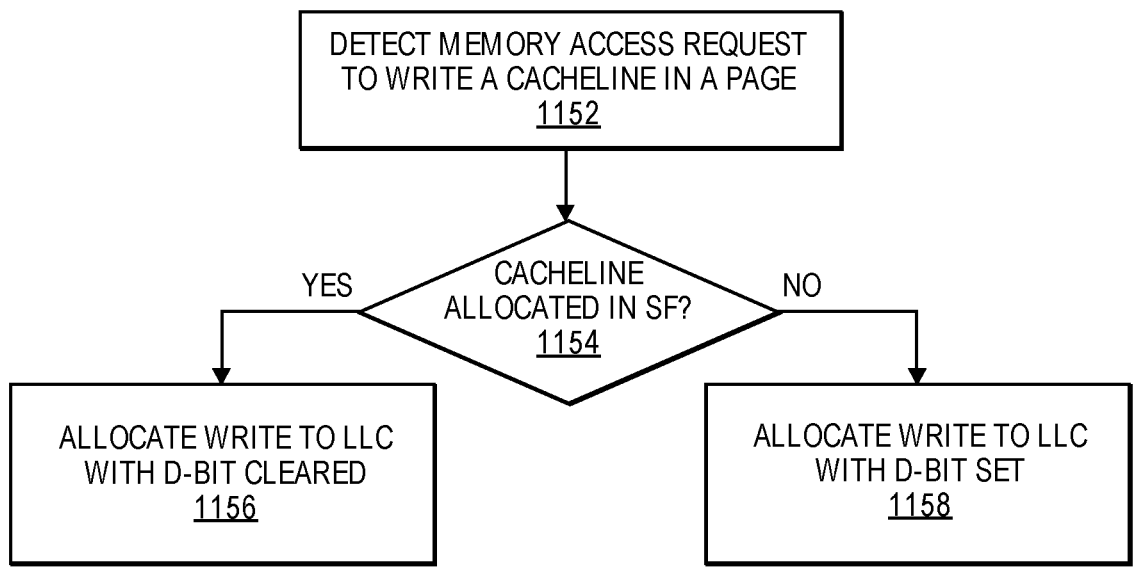
FIG. 11 illustrates a flow chart of a method performed by a line granular controller (LGC) responsive to detection of a memory write request.
Figure 12:
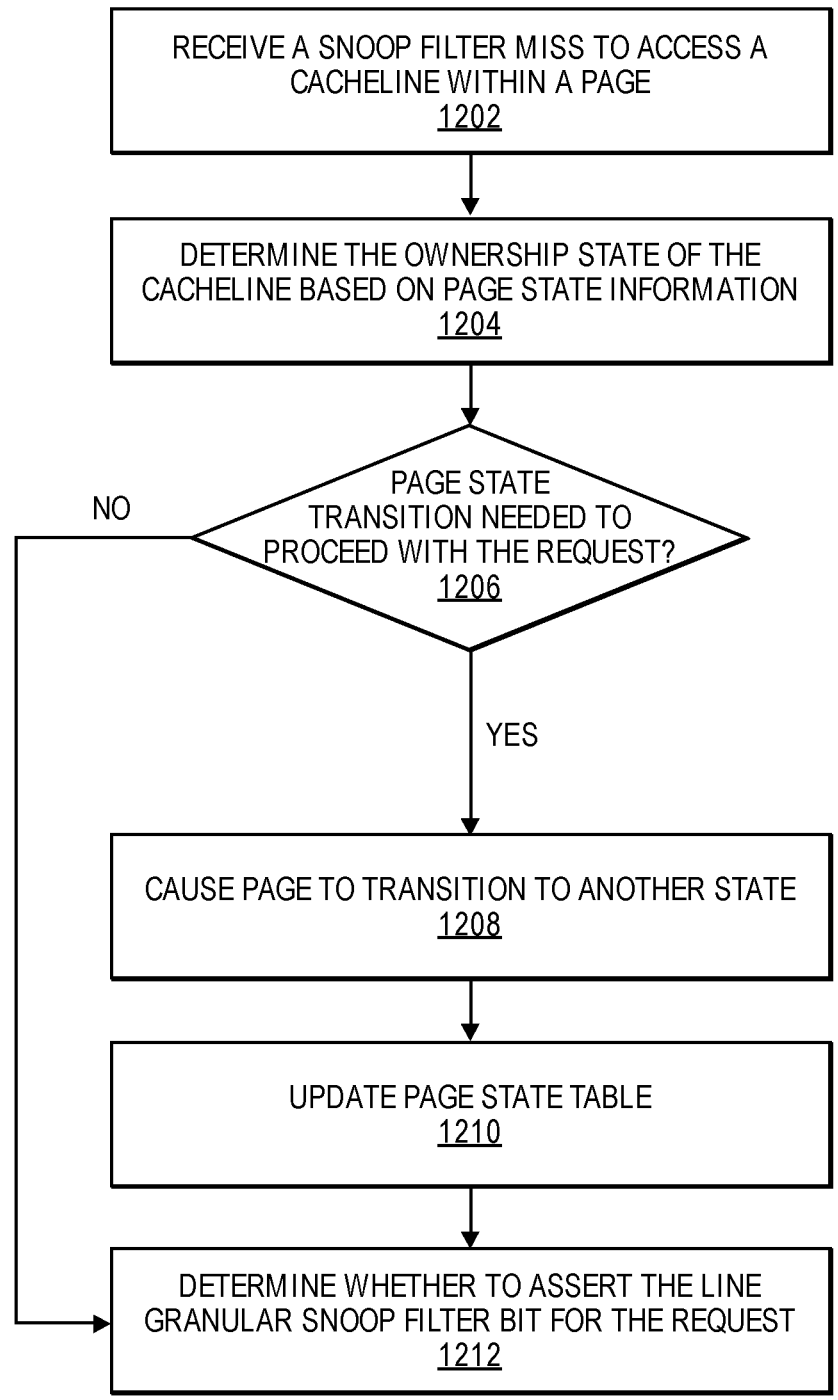
FIG. 12 illustrates a flow chart of a method performed by a page granular controller (PGC) responsive to a snoop filter miss.
Figure 13:
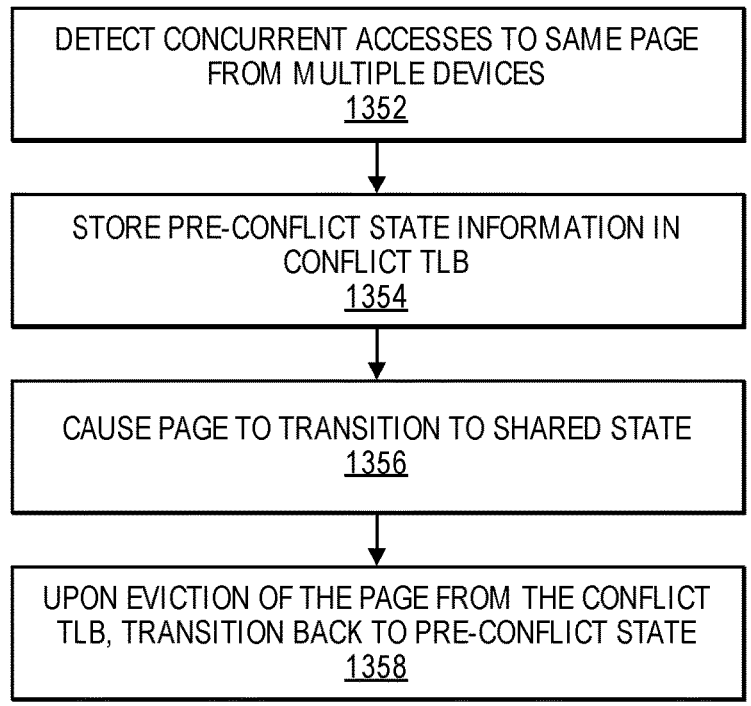
FIG. 13 illustrates a flow chart of a method performed by a page granular controller (PGC) when a conflict is detected.

FIGS. 10-13 are flow charts illustrating examples of methods for managing multi-level memory and coherency. FIGS. 10 and 11 are examples of methods performed by a LGC. FIGS. 12 and 13 are examples of methods performed by PGC. The methods can be performed by hardware, software, firmware, or a combination.

Referring to FIG. 10, the method 1000 begins with the LGC detecting a memory access request to read a cacheline in a page, at 1002. A memory access request from the host processor can be referred to as a D0 request, and a memory access request from the accelerator device can be referred to as a D1 request. The LGC then determines whether the line is allocated in the snoop filter and LLC, at 1008. If the line is allocated in the snoop filter and the LLC, 1008 YES branch, the LGC determines whether the D bit associated with the cacheline matches the memory access request, at 1009. For example, if the value of the D bit indicates the cacheline is in a page mapped to D1 and the requesting agent is the accelerator device (mapped to D1), then there is a match. If the value of the D bit indicates the cacheline is in a page mapped to D1 and the requesting agent is the host device (mapped to D0), then there is not a match. Similarly, if the value of the D bit indicates that the cacheline is in the S or D0 state and the requesting agent is the host processor, there is a match. If the value of the D bit indicates that the cacheline is in the S or D0 state and the requesting agent is the accelerator device, there is not a match. If there is a match, 1009 YES branch, the request can be satisfied by the LGC and snoop filter, at 1011. If there is not a match, 1009 NO branch, the PGC indicates a snoop filter miss to the PGC, at 1010.

After the PGC does a page lookup to determine the ownership state of the page (and possibly perform a page state transition if needed to satisfy the access request), the LGC receives indication from the PGC of the page state, at 1012. If the page is in the D1 state, 1014 NO branch, the LGC does not allocate the cacheline in the snoop filter, at 1015. The LGC can then forward the response to the requesting agent. If the page is in the D0 or shared state, 1014 YES branch, the LGC allocates the cacheline in the snoop filter at 1017 and clears the domain bit at 1018.

Referring again to block 1008, if the line is not allocated in the snoop filter and LLC, 1008 NO branch, the LGC determines whether the cacheline is allocated in the snoop filter (but not LLC), at 1004. If the cacheline is not allocated in the snoop filter, 1004 NO branch, then the LGC forwards the request to the PGC, at 1010. If the cacheline is allocated in the snoop filter, 1004 YES branch, then D0 requests can be satisfied by the LGC and snoop filter, at 1006. If the cacheline is in the snoop filter, but the request is a D1 request from the accelerator device, then the LGC can forward the request to the PGC for handling (e.g., determination of page state and possible page state transition).

FIG. 11 illustrates a flow chart of a method performed by the LGC responsive to detection of a memory write-back or copy-back from a lower level cache. The method 1150 begins with detecting a memory access request to write a cacheline in a page, at 1152. In one example, in order to write to the page, the requesting device must have ownership or the page must be shared. The LGC can determine whether the page containing the cacheline is in the D1 state based on whether the cacheline is allocated in the snoop filter. If the cacheline is allocated in the snoop filter, then the page is not in the D1 state (e.g., the page can be in the D0 or S states). In one example, if the cacheline is not allocated in the snoop filter, then the page is in the D1 state. Therefore, the LGC checks to see if the cacheline is allocated in the snoop filter, at 1154. If the cacheline is allocated in the snoop filter, 1154 YES branch, the LGC allocates the write to the LLC with the D bit cleared, at 1156. If the cacheline is not allocated in the snoop filter, 1154 NO branch, the LGC allocates the write to the LLC with the D bit set, at 1158. As mentioned above, the D bits can be included in the snoop filter or separate from the snoop filter. Thus, even though a cacheline in the D1 state is not allocated in the snoop filter, one or more bits of the snoop filter may be used to track the D bits. Thus, for a cacheline in a page in the D1 state, the cacheline is not allocated in the snoop filter, but the D bit is set.

FIG. 12 illustrates a flow chart of a method performed by a page granular controller (PGC) responsive to a snoop filter miss (e.g., after the snoop filter miss at 1010 of FIG. 10). Method 1200 begins with receiving a snoop filter miss from the LCG to access a cacheline within a page, at 1202. The PGC then does a page state lookup to determine the ownership state of the page, at 1204. In one example, the PGC can determine whether the page is mapped to D0, mapped to D1, or in a shared state. Determining the ownership state can provide information about potential locations of cached copies of the cacheline. After determining the ownership state, the PGC determines whether a page state transition is needed before the access request can proceed, at 1206. For example, the PGC can determine whether a copy of the cacheline will be created in a different domain as a result of the request. For example, referring to FIG. 2A, if the page is currently mapped to D0 and residing in remote memory, an access request from the accelerator device may cause the cacheline to be allocated in the unfiltered portion 216 of the device cache. In one such example, the PGC will cause the page to transition to D1 before the accelerator device can proceed with the access request.

If no page state transition is needed, 1206 NO branch, the PGC determines whether the line granular snoop filter bit for the request is to be asserted, at 1212. The PGC can then send a response to the LGC and the requesting agent with the state information and an indication that access request can proceed. If a page state transition is needed, 1206 YES branch, the PGC causes the page to transition to another state (e.g., another state in which cachelines from the page are cacheable in the requesting device's cache), at 1208. Causing the page state transition may result in sending a request to one or more agents to clear their caches of cachelines within the page. After the page state transition, the PGC also updates the page state table to reflect the new page state, at 1210. For example, referring to FIG. 7A, the page state bits S1 and S0 can be updated to the new page state. The PGC can then determine whether the line granular snoop filter bit is to be asserted for the request, at 1212.

FIG. 13 illustrates a flow chart of a method performed by the PGC when a conflict is detected. The method 1300 begins with detecting concurrent accesses to the same page from multiple devices (e.g., from both a host processor and accelerator), at 1352. In one such example, conflicts can be tracked using a page conflict table. One example of a page conflict table is an n-way set associative structure, such as a conflict TLB (translation lookaside buffer). For example, referring to the method 1300, the PGC stores the page's pre-conflict state information in the conflict TLB at 1354. In other examples, the TLB could store other information to enable transitioning back to the pre-conflict state. The PGC then causes the page to transition to the shared state, at 1356. In one such example, when the PGC receives a snoop filter miss from the LGC, the PGC first checks the conflict TLB to see if the page is allocated in the conflict TLB. If the page is allocated in the conflict TLB (a conflict TLB hit), then the PGC provides the shared domain mapping back to the requesting device, and the cacheline is tracked in the LGC snoop filter. The host may then generate snoops to the device as a result of the host or another device access. If the page is not allocated in the TLB (a conflict TLB miss), then the PGC checks the page state table (e.g., the state information in the tag cache, tag store, and/or page state table) to determine the state of the page.

The page can be deallocated from the conflict TLB in response to a number of scenarios. For example, if the conflict TLB is allocated with a new entry and if the conflict TLB set is full, and if the page is marked as the least recently used, then the PGC may deallocate the page from the conflict TLB. The PGC may also deallocate the page from the conflict TLB if the page is evicted from the near memory cache or in response to performance of an explicit page state transition. Upon eviction of the page from the conflict TLB, the PGC can cause the page to transition back to the pre-conflict state, at 1358.

Figure 14:
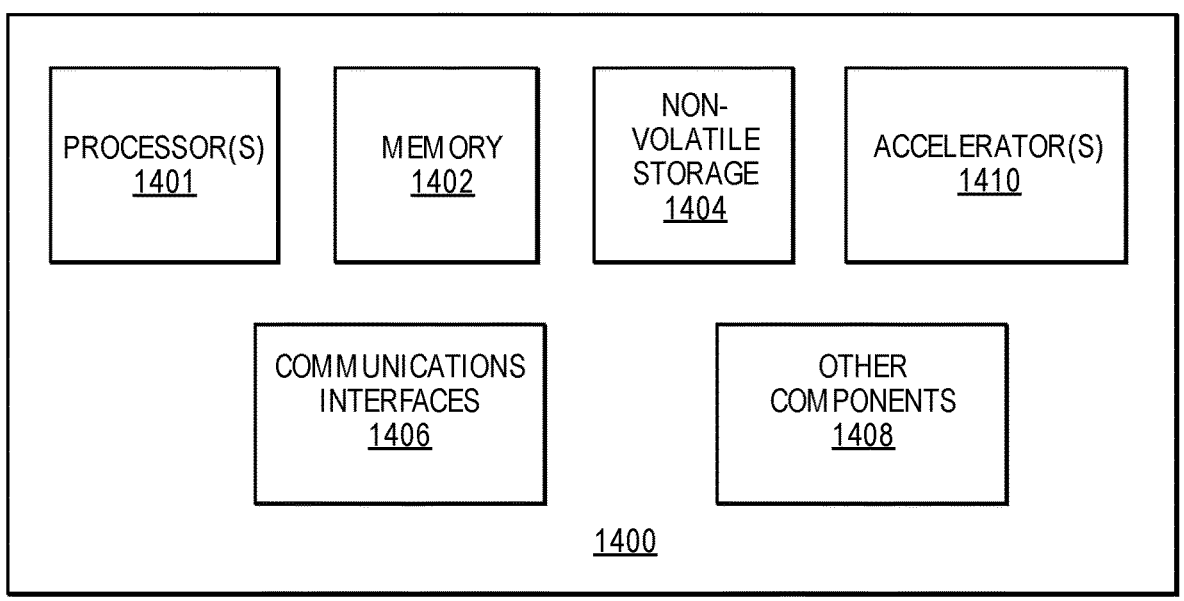
FIG. 14 illustrates a block diagram of an example of a system in which techniques for managing coherency and multi-level memory can be implemented.

FIG. 14 illustrates a block diagram of an example of a system in which techniques for managing coherency and multi-level memory can be implemented. The system can be, for example, a smartphone, a tablet computer, a laptop computer, a desktop computer, a server computer, etc. As observed in FIG. 14, the system 1400 may include one or more processors or processing units 1401. The processor(s) 1401 may include one or more central processing units (CPUs), each of which may include, e.g., a plurality of general purpose processing cores. The processor(s) 1401 may include memory management logic (e.g., a memory controller) and I/O control logic. The system 1400 also includes one or more accelerator(s) 1410. The accelerators can include one or more graphics processing units (GPUs) or other accelerator devices.

The system 1400 also includes memory 1402 (e.g., system memory), non-volatile storage 1404, communications interfaces 1406, and other components 1408. The other components may include, for example, a display (e.g., touchscreen, flat-panel), a power supply (e.g., a battery or/or other power supply), sensors, power management logic, or other components. The communications interfaces 1406 may include logic and/or features to support a communication interface. For these examples, communications interface 1406 may include one or more communication interfaces that operate according to various communication protocols or standards to communicate over direct or network communication links or channels. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Switch Specification. Other examples of communications interfaces include, for example, a local wired point-to-point link (e.g., USB) interface, a wireless local area network (e.g., WiFi) interface, a wireless point-to-point link (e.g., Bluetooth) interface, a Global Positioning System interface, and/or other interfaces.

The memory 1402 may include, for example, volatile memory. Volatile memory is memory whose state (and therefore the data stored on it) is indeterminate if power is interrupted to the device. Dynamic volatile memory requires refreshing the data stored in the device to maintain state. One example of dynamic volatile memory includes DRAM (dynamic random access memory), or some variant such as synchronous DRAM (SDRAM). Memory may be compatible with a number of memory technologies, such as DDR3 (dual data rate version 3, original release by JEDEC (Joint Electronic Device Engineering Council) on Jun. 27, 2007, currently on release 21), DDR4 (DDR version 4, initial specification published in September 2012 by JEDEC), LPDDR3 (low power DDR version 3, JESD209-3B, August 2013 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5 (currently in discussion by JEDEC), HBM2 (HBM version 2), currently in discussion byJEDEC), and/or others, and technologies based on derivatives or extensions of such specifications. As described above, the system 1400 may include multiple memories, such as host processor-attached memory and accelerator-attached memory. For example, the memory 1402 can be similar to or the same as the accelerator memory 108 and the near memory 106 of FIG. 1A.

The computing system also includes non-volatile storage 1404. Non-volatile storage may be used as the mass storage component of the system, as system memory, or both. For example, the non-volatile storage 1404 can be similar to, or the same as, the far memory 110 of FIG. 1A, described above. Non-volatile storage 1404 may include byte or block addressable types of non-volatile memory having a 3-dimensional (3D) cross-point memory structure that includes chalcogenide phase change material (e.g., chalcogenide glass) hereinafter referred to as "3D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magnetoresistive random access memory (MRAM) that incorporates memristor technology, spin transfer torque MRAM (STT-MRAM), or a combination of any of the above.

Examples of techniques to manage coherent links and multi-level memory follow. In one example, an apparatus to manage coherency in a system includes hardware storage to store information to indicate locations of pages in a memory hierarchy and an ownership state for the pages, the ownership state indicating whether the pages are owned by a host processor, owned by an accelerator device, or shared by the host processor and the accelerator device. The apparatus also includes logic to: in response to a memory access request from the host processor or the accelerator to access a cacheline in a page in a state indicating ownership by a device other than the requesting device, cause the page to transition to a state in which the requesting device owns or shares the page. In one example, the logic allows an access from a device to a page when the page is in a state indicating the device owns or shares the page. In one example, the hardware storage comprises on-die or on-package storage to store the information to indicate locations of pages in the memory hierarchy and the ownership state for the pages.

In one example, the logic is to in response to a memory request from the host processor or the accelerator to access a cacheline in a page that resides in far memory or remote memory, cause the page to be allocated to a near memory cache. In one such example, the logic is to, in response to an access that hits a full set in the near memory cache, de-allocate a least recently used victim page from the near memory cache and write modified data of the victim page to the far memory or the remote memory. In one example, the memory hierarchy includes a near memory cache and a far memory. In one such example, the information indicates locations in the near memory cache for far memory pages, and the far memory can store pages owned by the host processor, pages owned by the accelerator device, and shared memory pages. In one example, the memory hierarchy includes byte-addressable persistent memory, and the persistent memory can store pages owned by the host processor, pages owned by the accelerator device, and shared memory pages.

In one example, the near memory cache includes volatile memory, and the far memory comprises non-volatile byte addressable storage. In one example, the logic is to cause the information to be stored to the hardware storage, to a structure in near memory, and to a structure in the far memory. In one such example, the hardware storage is to store the information for recently accessed pages, the structure in the near memory is to store information for pages allocated to the near memory cache, and the structure in the far memory is to store information for all memory pages.

In one example, the information stored in the hardware storage, the structure in the near memory, and the structure in the far memory is to indicate locations in the near memory cache for far memory pages and the ownership state. In one example, the memory hierarchy includes a memory coupled with the accelerator device, the state information indicates locations for pages stored in the memory coupled with the accelerator device, and the memory coupled with the accelerator device can store pages owned by the host processor, pages owned by the accelerator device, and shared memory pages. In one example, the state information is to further indicate whether copies of cachelines of the page can be in one or more of: a host processor-side cache, a near memory cache, a filtered portion of an accelerator-side cache that is tracked in a host processor-side snoop filter, and a non-filtered portion of an accelerator-side cache that is not tracked in the host processor-side snoop filter. In one example, the hardware storage is to store one or more bits to indicate whether the page is mapped to a domain or shared by multiple domains. In one such example, domains include: a first domain to indicate a page is owned by the host processor and a second domain to indicate a page is owned by the accelerator device. In one example, the system includes multiple accelerator devices, and the domains include domains for groups of accelerator devices or a single domain for the multiple accelerator devices. In one example, the system includes multiple host processors, and the domains include domains for groups of host processors or a single domain for the multiple host processors.

In one example, the logic to cause a page to transition to another state is to update the state information for the page in the hardware storage is to cause a cache flush of any cachelines in the page having copies in a cache that is not mapped to the domain being transitioned to. In one example, the logic to cause a page to transition to another state is to update the information to indicate location and ownership state in a structure stored in memory. In one example, the logic is to receive a snoop filter miss to access a cacheline in a page and in response to receipt of the snoop filter miss, determine a state of the page based on the stored state information. In one example, the logic is to, in response to transition of the page to a state indicating ownership by the host processor or a shared state, cause one or more cachelines in the page to be allocated in a host processor-side snoop filter and, in response to transition of the page to a state indicating ownership by the accelerator device, cause cachelines in the page to not be allocated in the host processor-side snoop filter. In one example, the logic is to, in response to detection of concurrent memory access requests from both the host processor and the accelerator to access cachelines in a same page, cause the page to transition to a state in which the host processor and the accelerator share the page.

In one example, the logic is to, in response to the detection of concurrent memory access requests to access cachelines in the same page, store information indicating a conflict for the page. In one example, the logic is to store the information indicating the conflict for the page comprises allocating the page in a translation lookaside buffer (TLB) or FIFO (first in first out) of recent page conflicts, and in response to eviction of the page from the TLB or FIFO, cause a transition back to the page's pre-conflict state or other pre-defined conflict exit state. In one example, the logic is to, in response to a determination that the page is in the TLB or FIFO, determine the page is in a shared state, and in response to determination that the page is not in the TLB or FIFO, determine the state of the page based on the stored state information for the page. In one example, the logic is to de-allocate a page from the TLB or FIFO in response to detection of one or more conditions including: detection that the page is evicted from a near memory cache, and for a TLB, a determination that the TLB set is full and the page is marked as least recently used. In one example, the logic is to, in response to a number or frequency of page state transitions for a given page exceeding a threshold, cause the page to transition to a state in which the host processor and the accelerator share the page. In one example, the memory hierarchy includes a near memory cache, a far memory, and a memory coupled with the accelerator device. In one such example, both the far memory and the memory coupled with the accelerator device are accessible as coherent system memory visible by an operating system.

In one example, a system includes a host processor, a memory coupled with the host processor, an accelerator device, hardware storage to store information to indicate locations of pages in a memory hierarchy and an ownership state for the pages, the ownership state indicating whether the pages are owned by a host processor, owned by an accelerator device, or shared by the host processor and the accelerator device, and logic to: in response to a memory access request from the host processor or the accelerator to access a cacheline in a page in a state indicating ownership by a device other than the requesting device, cause the page to transition to a state in which the requesting device owns or shares the page.

In one example, a method of managing coherency in a system involves storing state information that indicates location of pages in a memory hierarchy and an ownership state for the pages, the ownership state indicating whether the pages are owned by a host processor, owned by an accelerator device, or shared by the host processor and the accelerator device, and in response to a memory access request from the host processor or the accelerator to access a cacheline in a page in a state indicating ownership by a device other than the requesting device, causing the page to transition to a state in which the requesting device owns or shares the page. In one example, the method involves, in response to a memory request from the host processor or the accelerator to access a cacheline in a page that resides in far memory or remote memory, causing the page to be allocated to a near memory cache. In one example, in response to an access that hits a full set in the near memory cache, the method involves de-allocating a least recently used victim page from the near memory cache and writing modified data of the victim page to the far memory or the remote memory.

In one example, the method involves causing the information to be stored to hardware storage, to a structure in near memory, and to a structure in the far memory. In one such example, the hardware storage is to store the information for recently accessed pages, the structure in the near memory is to store information for pages allocated to the near memory cache, and the structure in the far memory is to store information for all memory pages, and the information to be stored in the hardware storage, the structure in the near memory, and the structure in the far memory is to indicate locations in the near memory cache for far memory pages and the ownership state.

In one example, causing a page to transition to another state includes updating the state information for the page in the hardware storage and causing a cache flush of any cachelines in the page having copies in a cache that is not mapped to the domain being transitioned to. In one example, causing a page to transition to another state further involves updating the information to indicate location and ownership state in a structure stored in memory. In one example, the method involves receiving a snoop filter miss to access a cacheline in a page and in response to receipt of the snoop filter miss, determining a state of the page based on the stored state information.

In one example, at least one non-transitory machine readable medium having stored thereon one or more instructions that, when executed by a computing device, causes the computing device to perform a method, such as the methods described above. In on example, an apparatus to manage coherency in a system includes a means to store information to indicate locations of pages in a memory hierarchy and an ownership state for the pages, the ownership state indicating whether the pages are owned by a host processor, owned by an accelerator device, or shared by the host processor and the accelerator device, and means to, in response to a memory access request from the host processor or the accelerator to access a cacheline in a page in a state indicating ownership by a device other than the requesting device, cause the page to transition to a state in which the requesting device owns or shares the page.

Thus, the techniques described herein can enable hardware coherency between host processors and accelerators, which can enable a shared memory environment that can be coherently accessed by both the host processors and accelerators. Enabling such an environment without creating performance penalties may significantly contribute to ease of programming and can enable better software utilization of both host and accelerators. Providing a highly scalable and robust architecture, which enables efficient hardware coherency between host and accelerator, in integrated, packaged and discrete cases, can have a variety of applications such as PC gaming and console gaming, automotive, and industrial applications.

Embodiments of the invention may include various processes as set forth above. The processes may be embodied in machine-executable instructions. The instructions can be used to cause a general-purpose or special-purpose processor to perform certain processes. Alternatively, these processes may be performed by specific/custom hardware components that contain hardwired logic circuitry or programmable logic circuitry (e.g., FPGA, PLD) for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions.

Flow diagrams as illustrated herein provide examples of sequences of various process actions. The flow diagrams can indicate operations to be executed by a software or firmware routine, as well as physical operations. In one example, a flow diagram can illustrate the state of a finite state machine (FSM), which can be implemented in hardware, software, or a combination. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various examples; thus, not all actions are required in every embodiment. Other process flows are possible.

To the extent various operations or functions are described herein, they can be described or defined as software code, instructions, configuration, data, or a combination. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters or sending signals, or both, to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. An apparatus to manage coherency in a system, the apparatus comprising:
   first hardware storage to store information to indicate locations of pages in a memory hierarchy and an ownership state for the pages, the ownership state to indicate whether the pages are owned by a host processor, owned by an accelerator device, or shared by the host processor and the accelerator device;
   second hardware storage to store domain information for cachelines, the domain information to indicate whether a cacheline is in a page owned by the accelerator device; and
   logic to:
      receive a memory access request from a requesting device to read a cacheline in a page,
      determine whether the domain information indicates ownership of the cacheline by a device other than the requesting device,
      in response to the cacheline being owned by a device other than the requesting device, determine whether the ownership state for the page indicates ownership of the page by a device other than the requesting device, and
      in response to the page being owned by a device other than the requesting device, cause the page to transition to a state in which the requesting device owns or shares the page.

2. The apparatus of claim 1, wherein the logic is to allow an access from a device to a page when the page is in a state indicating the device owns or shares the page.

3. The apparatus of claim 1, wherein:
   the first hardware storage comprises on-die or on-package storage to store the information to indicate locations of pages in the memory hierarchy and the ownership state for the pages.

4. The apparatus of claim 1, wherein the logic is to:
   in response to a memory request from the host processor or the accelerator to access a cacheline in a page that resides in far memory or remote memory, cause the page to be allocated to a near memory cache.

5. The apparatus of claim 4, wherein the logic is to:
   in response to an access that hits a full set in the near memory cache, de-allocate a least recently used victim page from the near memory cache and write modified data of the victim page to the far memory or the remote memory.

6. The apparatus of claim 1, wherein:
the memory hierarchy includes a near memory cache and a far memory;
wherein the information indicates locations in the near memory cache for far memory pages; and
wherein the far memory is to store pages owned by the host processor, pages owned by the accelerator device, and shared memory pages.

7. The apparatus of claim 6, wherein:
the near memory cache comprises volatile memory; and
wherein the far memory comprises non-volatile byte addressable storage.

8. The apparatus of claim 6, wherein:
the logic is to cause the information to be stored to the hardware storage, to a structure in near memory, and to a structure in the far memory;
wherein the hardware storage is to store the information for recently accessed pages, the structure in the near memory is to store information for pages allocated to the near memory cache, and the structure in the far memory is to store information for all memory pages; and
wherein the information to be stored in the hardware storage, the structure in the near memory, and the structure in the far memory is to indicate locations in the near memory cache for far memory pages and the ownership state.

9. The apparatus of claim 6, wherein:
the memory hierarchy includes a memory coupled with the accelerator device;
wherein the information stored in the first hardware storage indicates locations for pages stored in the memory coupled with the accelerator device; and
wherein the memory coupled with the accelerator device is to store pages owned by the host processor, pages owned by the accelerator device, and shared memory pages.

10. The apparatus of claim 1, wherein:
the memory hierarchy includes byte-addressable persistent memory; and
wherein the persistent memory is to store pages owned by the host processor, pages owned by the accelerator device, and shared memory pages.

11. The apparatus of claim 1, wherein:
the ownership state is to further indicate whether copies of cachelines of the pages are to be in one or more of: a host processor-side cache, a near memory cache, a filtered portion of an accelerator-side cache that is tracked in a host processor-side snoop filter, and a non-filtered portion of an accelerator-side cache that is not tracked in the host processor-side snoop filter.

12. The apparatus of claim 1, wherein:
the hardware storage is to store one or more bits to indicate whether the page is mapped to a domain or shared by multiple domains; and
wherein domains include: a first domain to indicate a page is owned by the host processor and a second domain to indicate a page is owned by the accelerator device.

13. The apparatus of claim 12, wherein the system includes multiple accelerator devices, and wherein the domains include domains for groups of accelerator devices or a single domain for the multiple accelerator devices.

14. The apparatus of claim 12, wherein the system includes multiple host processors, and wherein the domains include domains for groups of host processors or a single domain for the multiple host processors.

15. The apparatus of claim 12, wherein the logic to cause a page to transition to another state is to:
update the ownership state for the page in the first hardware storage; and
cause a cache flush of any cachelines in the page having copies in a cache that is not mapped to the domain being transitioned to.

16. The apparatus of claim 15, wherein the logic to cause a page to transition to another state is to:
update the information to indicate location and ownership state in a structure stored in memory.

17. The apparatus of claim 15, wherein the logic is to:
in response to transition of the page to a state indicating ownership by the host processor or a shared state, cause one or more cachelines in the page to be allocated in a host processor-side snoop filter; and
in response to transition of the page to a state indicating ownership by the accelerator device, cause cachelines in the page to not be allocated in the host processor-side snoop filter.

18. The apparatus of claim 1, wherein the logic is to:
receive a snoop filter miss to access the cacheline in the page; and
in response to receipt of the snoop filter miss, determine whether the ownership state for the page indicates ownership of the page by a device other than the requesting device based on the the ownership state of the page.

19. The apparatus of claim 1, wherein the logic is to:
in response to detection of concurrent memory access requests from both the host processor and the accelerator device to access cachelines in a same page, cause the page to transition to a state in which the host processor and the accelerator device share the page.

20. The apparatus of claim 19, wherein the logic is to:
in response to the detection of concurrent memory access requests to access cachelines in the same page, store information indicating a conflict for the page.

21. The apparatus of claim 20, wherein the logic is to:
store the information indicating the conflict for the page comprises allocating the page in a translation lookaside buffer (TLB) or FIFO (first in first out) of recent page conflicts; and
in response to eviction of the page from the TLB or FIFO, cause a transition back to the page's pre-conflict state or other pre-defined conflict exit state.

22. The apparatus of claim 21, wherein the logic is to:
in response to a determination that the page is in the TLB or FIFO, determine the page is in a shared state; and
in response to determination that the page is not in the TLB or FIFO, determine the state of the page based on the ownership state for the page.

23. The apparatus of claim 21, wherein the logic is to:
de-allocate a page from the TLB or FIFO in response to detection of one or more conditions including: detection that the page is evicted from a near memory cache, and for a TLB, a determination that the TLB set is full and the page is marked as least recently used.

24. The apparatus of claim 1, wherein the logic is to:
in response to a number or frequency of page state transitions for a given page exceeding a threshold, cause the page to transition to a state in which the host processor and the accelerator device share the page.

25. The apparatus of claim 1, wherein:
the memory hierarchy includes a near memory cache coupled with the host processor, a far memory coupled with the host processor, and the memory coupled with the accelerator device; and
wherein both the far memory and the memory coupled with the accelerator device are accessible as coherent system memory visible by an operating system.

26. A system comprising:
a host processor;
a memory coupled with the host processor;
an accelerator device;
first hardware storage to store information to indicate locations of pages in a memory hierarchy and an ownership state for the pages, the ownership state to indicate whether the pages are owned by the host processor, owned by the accelerator device, or shared by the host processor and the accelerator device;
second hardware storage to store domain information for cachelines, the domain information to indicate whether a cacheline is in a page owned by the accelerator; and
logic to:
receive a memory access request from a requesting device to read a cacheline in a page,
determine whether the domain information indicates ownership of the cacheline by a device other than the requesting device,
in response to the cacheline being owned by a device other than the requesting device, determine whether the ownership state for the page indicates ownership of the page by a device other than the requesting device, and in response to the page being owned by a device other than the requesting device, cause the page to transition to a state in which the requesting device owns or shares the page.

27. The system of claim 26, wherein the logic is to allow an access from a device to a page when the page is in a state indicating the device owns or shares the page.

28. A method of managing coherency in a system, the method comprising:
storing information that indicates location of pages in a memory hierarchy and an ownership state for the pages, the ownership state to indicate whether the pages are owned by a host processor, owned by an accelerator device, or shared by the host processor and the accelerator device;
storing domain information for cachelines, the domain information to indicate whether a cacheline is in a page owned by the accelerator device;
receiving a memory access request from a requesting device to read a cacheline in a page;
determining whether the domain information indicates ownership of the cacheline by a device other than the requesting device;
in response to the cacheline being owned by a device other than the requesting device, determining whether the ownership state for the page indicates ownership of the page by a device other than the requesting device; and
in response to the page being owned by a device other than the requesting device, causing the page to transition to a state in which the requesting device owns or shares the page.

29. The method of claim 28, wherein the cacheline in the page is accessible to a device when the page is in a state indicating the device owns or shares the page.

* * * * *